United States Patent [19]

Amano et al.

[11] Patent Number: 5,144,527
[45] Date of Patent: Sep. 1, 1992

[54] MULTILAYER CAPACITOR AND METHOD OF FABRICATING THE SAME

[75] Inventors: Toshinori Amano; Susumu Mori, both of Nagaokakoyo, Japan

[73] Assignee: Murata Manufacturing Co., Ltd., Japan

[21] Appl. No.: 663,942

[22] PCT Filed: Aug. 24, 1990

[86] PCT No.: PCT/JP90/01075

§ 371 Date: Mar. 14, 1991

§ 102(e) Date: Mar. 14, 1992

[87] PCT Pub. No.: WO91/03064

PCT Pub. Date: Jul. 3, 1991

[30] Foreign Application Priority Data

| Aug. 24, 1989 | [JP] | Japan | 1-218275 |
| Aug. 24, 1989 | [JP] | Japan | 1-218276 |
| Aug. 24, 1989 | [JP] | Japan | 1-218277 |
| Aug. 24, 1989 | [JP] | Japan | 1-218278 |
| Aug. 24, 1989 | [JP] | Japan | 1-218279 |
| Oct. 4, 1989 | [JP] | Japan | 1-261204 |
| Oct. 6, 1989 | [JP] | Japan | 1-262495 |
| Oct. 16, 1989 | [JP] | Japan | 1-269278 |
| Oct. 16, 1989 | [JP] | Japan | 1-269279 |

[51] Int. Cl.$^5$ .......... H01G 4/30; H01G 7/00; H01G 1/14
[52] U.S. Cl. .................. 361/321; 29/25.42; 361/309
[58] Field of Search ........... 29/25.42; 361/303–305, 361/320, 321, 328–330, 308–310

[56] References Cited

U.S. PATENT DOCUMENTS

| 2,673,792 | 3/1954 | Gulton | 29/25.42 |
| 3,348,971 | 10/1967 | Boykin | 29/25.42 |
| 3,648,132 | 3/1972 | Rayburn | 29/25.42 X |
| 3,965,552 | 6/1976 | Rutt | 29/25.42 |
| 4,618,912 | 10/1986 | Sakabe et al. | 361/321 X |

FOREIGN PATENT DOCUMENTS

| 49-103168 | 9/1974 | Japan . |
| 55-65420 | 5/1980 | Japan . |
| 55-65421 | 5/1980 | Japan . |
| 57-85213 | 5/1982 | Japan . |
| 58-167773 | 10/1983 | Japan . |
| 63-187612 | 8/1988 | Japan . |

*Primary Examiner*—Donald A. Griffin
*Attorney, Agent, or Firm*—Ostrolenk, Farber, Gerb & Soffen

[57] ABSTRACT

A multilayer capacitor constructed using a monolithic type dielectric body in which a plurality of dielectric layers are laminated with inner electrodes being interposed therebetween and having a structure in which the width of the inner electrodes is made smaller than that of the dielectric layers so that side margin regions are provided in side parts of the inner electrodes. In this multilayer capacitor, the inner electrodes originally have the same width as the dielectric layers and have side edges which are exposed at side surfaces of the above described monolithic type dielectric body. The exposed side edges of the inner electrodes are etched or physically removed to form the above described side margin regions. The side margin regions are formed by removing parts of the inner electrodes by etching or physical removal, so that the width of the side margin regions is accurately achieved. In addition, the multilayer capacitor is constructed by forming the above side margin regions after overlapping the inner electrodes while they still have the same width as the dielectric layers, so that the overlapping area of the inner electrodes is accurately controlled.

19 Claims, 18 Drawing Sheets

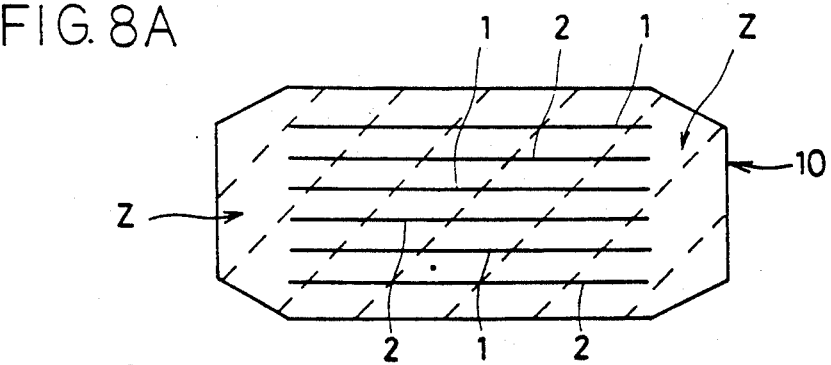
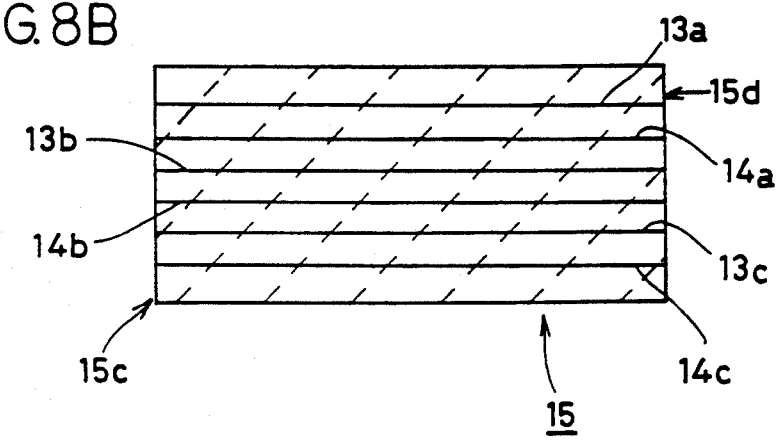
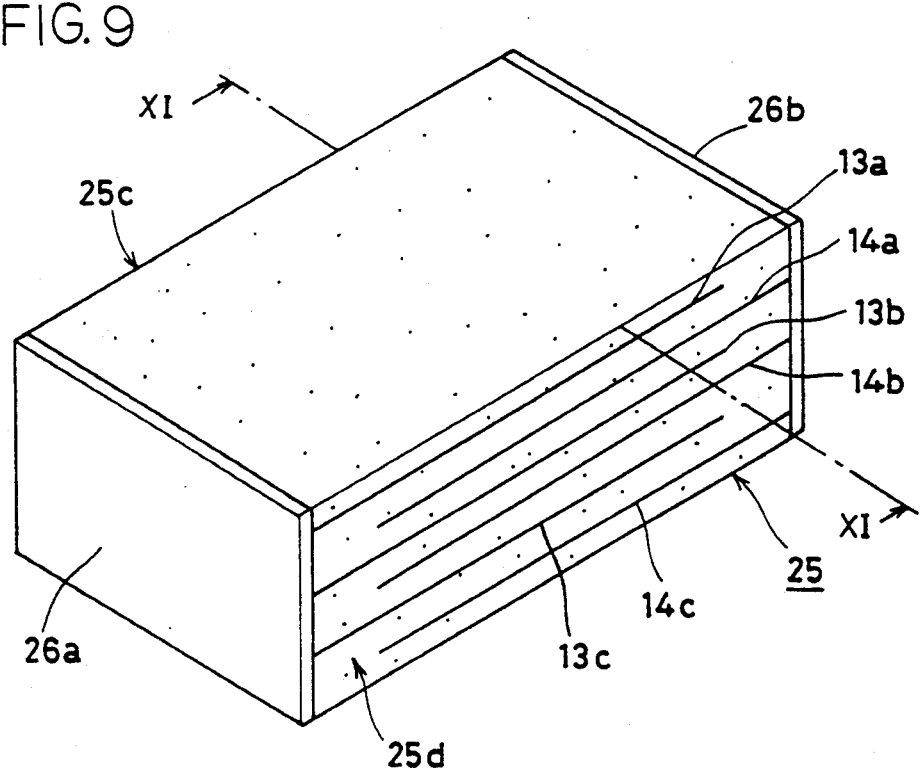

MULTILAYER CAPACITOR AND METHOD OF FABRICATING THE SAME

FIELD OF THE INVENTION

The present invention relates generally to a multilayer capacitor and a method of fabricating the same, and more particularly, to a multilayer capacitor having improvements in its structure and in the process of forming side margin regions between inner electrodes and side surfaces of a dielectric body and a method of fabricating the same.

BACKGROUND OF THE INVENTION

Conventionally, a multilayer capacitor has been widely used so as to achieve smaller size and larger capacitance. In fabricating the multilayer capacitor, ceramic green sheets 3 and 4 respectively coated with inner electrode material layers 1 and 2 made of conductive paste are prepared, as shown in, for example, the plan views of FIGS. 1A and 1B. Then, a plurality of ceramic green sheets 3 and 4 are alternately laminated. The laminated body thus obtained is pressed in the direction of thickness and then, fired. Outer electrodes are then formed on end surfaces of a sintered body to which the inner electrode material layers 1 and 2 are led out.

The inner electrode material layers 1 and 2 formed on the ceramic green sheets 3 and 4 are formed so as to extend from first edges 3a and 4a of the ceramic green sheets 3 and 4 toward second edges 3b and 4b thereof. In addition, the inner electrode material layers 1 and 2 are respectively formed to have such a width that side margin regions 5 having a width of x are left between side edges 3c and 3d and 4c and 4d of the ceramic green sheets 3 and 4 and the inner electrode material layers 1 and 2.

The side margin regions 5 are provided for increasing adhesive properties between the ceramic green sheets located on upper and lower sides of the inner electrode material layers 1 and 2 as well as for preventing the inner electrode material layers 1 and 2 from being exposed to side surfaces of the sintered body after sintering. Consequently, it has been conventionally essential to form the side margin regions 5 having a width of x near side parts of the inner electrode material layers 1 and 2 in the multilayer capacitor.

If the width x of the side margin regions 5 is large, however, the width of the inner electrode material layers 1 and 2 is substantially decreased, to prevent the multilayer capacitor from having a greater capacitance. Consequently, it is preferable that the width x of the side margin regions 5 is small so as to make the multilayer capacitor much smaller in size and larger in capacitance.

On the other hand, in mass-producing the multilayer capacitor, relatively large mother ceramic green sheets 6 and 7 are prepared, as shown in the plan views of FIGS. 2A and 2B. A plurality of mother inner electrode material layers 8 and 9 are respectively formed on respective first major surfaces of the mother ceramic green sheets 6 and 7, and a plurality of mother ceramic green sheets 6 and 7 are alternately laminated. Thereafter, the laminated body obtained in this way is cut at locations corresponding to portions one dot and dash lines A and B shown in FIGS. 2A and 2B, thereby to obtain individual laminated bodies. Then, the individual laminated bodies obtained are fired and a pair of outer electrodes are formed on both end surfaces of the sintered body obtained, thereby to fabricate a multilayer capacitor.

However, in laminating the mother ceramic green sheets 6 and 7 respectively having the plurality of mother inner electrode material layers 8 and 9 formed therein, some shift in lamination is forced to occur. As a result, in each of the laminated bodies after cutting, the inner electrode material layers are liable to be exposed to side surfaces of the laminated body. If the inner electrode material layers are exposed to the side surfaces of the laminated body, inferior withstand voltage and shorting of the inner electrode materials.

Furthermore, even if the inner electrode material are not exposed to the side surfaces of the laminated body, but merely lead to the vicinities of the side surfaces of the sintered body obtained, that is, if the width of the side margin regions 5 shown in FIGS. 1A and 1B is very small, the adhesive strength between respective of upper and lower ceramic layers is not sufficiently high, which causes delamination to occur after sintering.

Additionally, if the above described shift in lamination occurs, the overlapping area of the inner electrode materials becomes smaller than intended, so that there is a possibility that the capacitance value may be made lower than the designed capacitance.

For the above described reasons, it is preferable for the width x of the side margin regions 5 to be small, but width x must be made larger than necessary, which prevents the multilayer capacitor from being smaller in size larger in capacitance. In addition, the variation in capacitance value caused by either a shift in lamination or delamination is liable to occur.

OBJECT OF THE INVENTION

Accordingly, an object of the present invention is to provide a low-cost multilayer capacitor which can be made much smaller in size and larger in capacitance as compared with the conventional multilayer capacitor, does not largely vary in capacitance value, and can be fabricated by relatively simple processes.

SUMMARY OF THE INVENTION

In accordance with a broad aspect of the present invention, in a multilayer capacitor which has a monolithic type dielectric body in which a plurality of dielectric layers are laminated with inner electrodes being interposed therebetween and in which the width of the inner electrodes is smaller than that of the dielectric layers so that side margin regions are provided in side parts of the inner electrodes, the multilayer capacitor is characterized in that the above side margin regions are formed by etching or physically removing, on side surfaces of the dielectric body to which side edges of the inner electrodes having the same width as that of the dielectric layers are exposed, the exposed side edges of the inner electrodes.

In accordance with a particular aspect of the present invention, at least the side edges of the above described inner electrodes are oxidized to form oxide films at the side edges. Further, in accordance with another particular aspect, cavities obtained as the result of forming the side margin regions by etching or physically removing the side edges of the above inner electrodes are filled with sealing materials. In accordance with still another aspect, the above described dielectric layers comprise dielectric ceramic layers, and the above described monolithic type dielectric body is constituted by a sintered body in which inner electrodes are alternately led out to its first and second end surfaces in the direction of thickness. A pair of outer electrodes is formed on the first and second end surfaces of the above sintered body.

Furthermore, according to the present invention, a multilayer capacitor in which a plurality of dielectric layers are laminated with inner electrodes being interposed therebetween and the width of the inner electrodes is made smaller than that of the above dielectric layers so that side margin regions are provided in side parts of the inner electrodes is fabricated by a method comprising the following steps. More specifically, the method is characterized by comprising the steps of obtaining a monolithic type dielectric body in which a plurality of dielectric layers are laminated with inner electrodes being interposed therebetween and the width of the inner electrodes is made equal to that of the dielectric layers, and forming side margin regions in side parts of the inner electrodes by etching or physically removing, on side surfaces of the monolithic type dielectric body to which side edges of the inner electrodes are exposed, the exposed side edges of the inner electrodes.

In a particular aspect of the present invention, the above described step of obtaining a monolithic type dielectric body comprises the steps of forming on one major surface of a rectangular dielectric sheet an inner electrode material from one edge of the dielectric sheet toward the other edge opposed to the one edge but not to lead to the other edge and over the entire width between side edges which connect the above edges, and laminating a plurality of dielectric sheets as described above such that their respective one edges to which the above inner electrode materials are led out are alternately located on opposite sides. Further, in accordance with a more particular aspect, the above described step of forming side margin regions comprises the steps of coating first and second end surfaces of the monolithic type dielectric body which derive from the edges, to which the inner electrode materials are led out, of the above dielectric sheets with resist materials, etching inner electrode material portions exposed to a pair of side surfaces of the monolithic type dielectric body which derives from the side edges of the above dielectric sheets using etchant which does not attack the above resist materials to form side margin regions between the pair of side surfaces and the inner electrodes, and removing the above resist materials. Furthermore, the method further comprises the step of forming a pair of outer electrodes on the side surfaces of the monolithic type dielectric body.

Meanwhile, the pair of outer electrodes may be formed after or before forming the above described side margin regions.

Furthermore, in accordance with another particular aspect of the present invention, cavities formed as the result of forming side margin regions by the above described etching or physical removal are filled with sealing materials. Further, at least side edges of inner electrodes are oxidized to form oxide films preferably by forming the side margin regions and then, heating a monolithic type dielectric body in the oxidation atmosphere. Furthermore, in accordance with still another aspect of the present invention, the method further comprises the step of heating or neutralizing etchant remaining in the cavities formed by forming the above side margin regions not to act as an etching material.

Additionally, in accordance with another particular aspect of the present invention, the step of obtaining a monolithic type dielectric body comprises the steps of obtaining a monolithic type dielectric green chip having a plurality of ceramic green sheets each having on its one major surface a first inner electrode material comprising a difficult etching material provided to the vicinity of one edge along the edge and a second inner electrode material comprising an easy etching material provided so as to extend from one edge to the other edge opposed to the one edge and over the entire width on the side of an upper or lower surface of the first inner electrode material laminated such that their respective one edges on the side of the first inner electrode materials provided are alternately located on opposite end surfaces in the direction of thickness, and firing the monolithic type dielectric green chip to sinter the ceramic green sheets as well as baking the first and second inner electrode materials to form a plurality of inner electrodes each having first and second inner electrode portions. The monolithic type dielectric body thus obtained is etched by a chemical agent for selectively engraving the above second inner electrode portions to remove at least portions, which are exposed to the side surfaces of the dielectric body, of the second inner electrode portions and their vicinities, thereby to form side margin regions. In this case, a pair of outer electrodes is formed on both opposed end surfaces, to which the above first inner electrode portions are exposed, of the dielectric body.

Furthermore, in accordance with a further particular aspect of the present invention, the step of obtaining a monolithic type dielectric body comprises the steps of laminating a plurality of ceramic green sheets each having a first inner electrode material comprising a difficult etching material provided in the vicinity of its one edge along the edge and a second inner electrode material comprising an easy etching material provided over its entire width so as to be connected to the first inner electrode material and extend to an edge opposed to the above one edge such that their respective edges on the side of the first inner electrode materials provided are alternately located on opposite end surfaces in the direction of thickness, and firing the above monolithic type dielectric green chip to sinter the ceramic green sheets as well as baking the first and second inner electrode materials to form a plurality of inner electrodes each comprising first and second inner electrode portions. In this case, the sintered body obtained is etched by a chemical agent for selectively engraving the second inner electrode portions to remove at least portions, which are exposed to the side surfaces of the sintered body, of the second inner electrode portions and their vicinities, thereby to form side margin regions. Outer electrodes are then formed on a pair of end surfaces, to which the inner electrodes are led out, of the sintered body.

According to the present invention, side edge of inner electrodes are etched or physically removed after obtaining the monolithic type dielectric body, thereby to form side margin regions in side parts of the inner electrodes. Consequently, the width of the side margin regions can be accurately achieved. In addition, the overlapping area of the inner electrodes can be accurately controlled. Accordingly, the variation in capacitance of a multilayer capacitor can be decreased.

Furthermore, since inner electrodes having the same width as that of dielectric layers are laminated and side margin regions are formed by etching or physical removal after the lamination, the width of the side margin regions need not be made larger than necessary in consideration of the shift in lamination. Accordingly, a multilayer capacitor smaller in size and larger in capacitance can be obtained.

Additionally, since a laminated body is used in which outer electrodes having the same width as that of the dielectric layers are laminated, the allowance to the shift in lamination is large, thereby to make it possible to easily perform the laminating work and obtain a multilayer capacitor having side margin regions having a width decreased to a minimum essential.

BRIEF DESCRIPTION OF THE DRAWINGS

FIGS. 8A and 8B are schematic cross sectional views for explaining the shapes of a laminated body after pressing in the conventional example and the present embodiment, respectively, where FIG. 8B is a cross sectional view of a portion taken along a line VIII—VIII in FIG. 5.

FIG. 9 is a perspective view showing a state where resist materials are provided to first and second end surfaces of a sintered body.

BEST MODE FOR CARRYING OUT THE INVENTION

First embodiment

Referring to FIGS. 3 to 14, description is made of a multilayer capacitor according to a first embodiment of the present invention and a method of fabricating the same. The present embodiment is applied to a multilayer capacitor using dielectric ceramics and a method of fabricating the same.

Figure 4:
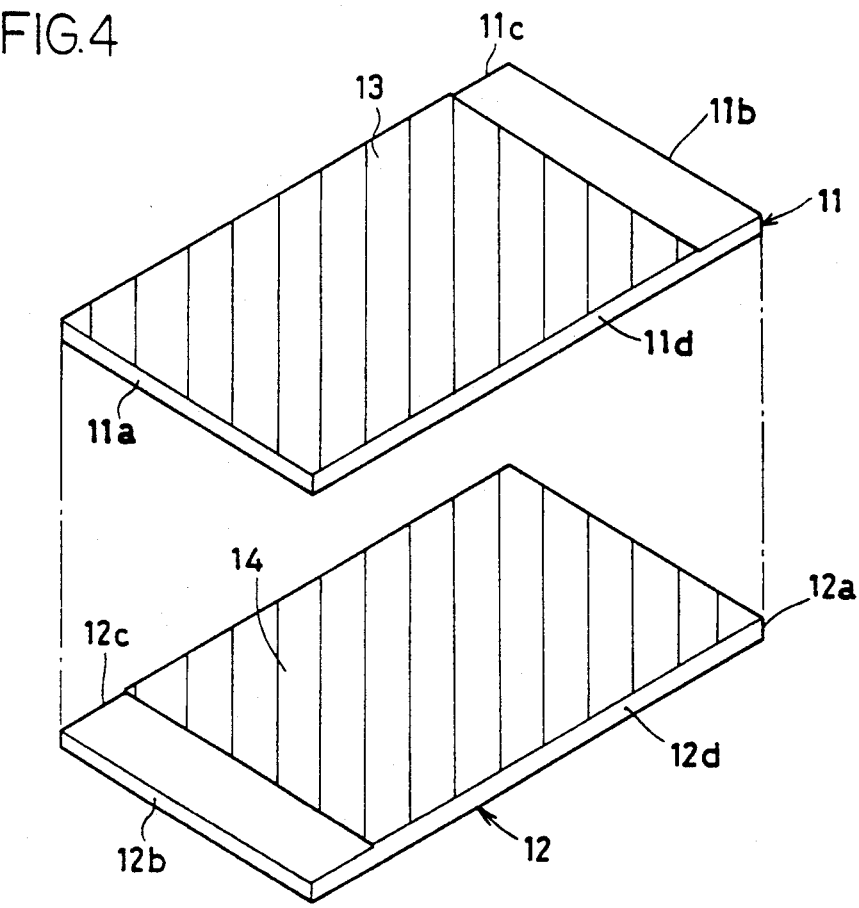
FIG. 4 is a perspective view for explaining the shapes of ceramic green sheets used in the fabrication according to the first embodiment of the present invention and inner electrode material layers formed thereon.

FIG. 4 is a perspective view for explaining ceramic green sheets serving as dielectric layers used in the fabrication according to the present embodiment and inner electrode material formed thereon. Inner electrode material 13 and 14 are respectively formed in a film shape on the upper surfaces of rectangular ceramic green sheets 11 and 12.

The ceramic green sheets 11 and 12 are obtained by molding ceramic slurry mainly composed of dielectric ceramics in the shape as shown. The inner electrode material 13 and 14 are constructed by being coated with conductive paste mainly composed of a conductive material such as Ni or Cu. As materials constituting the inner electrode materials, various metal material layers such as Ag or Ag-Pd in addition to Ni and Cu can be used, provided that they can be engraved by suitable etchant in the etching process as described later.

The inner electrode material layer 13 is formed so as to extend from one edge 11a of the rectangular ceramic green sheet 11 toward an edge 11b on the opposite side of the edge 11a but not to lead to the edge 11b. In addition, the width of the inner electrode material layer 13 is made equal to that of the ceramic green sheet 11. More specifically, the inner electrode material layer 13 is formed over the entire width between side edges 11c and 11d of the ceramic green sheet 11.

The inner electrode material layer 14 is formed similarly to the inner electrode material layer 13, provided that one edge 12a of the ceramic green sheet 12 to which the inner electrode material layer 14 is led out is located on the opposite side of the edge 11a of the ceramic green sheet 11 such that the inner electrode material layers 13 and 14 are led out to opposed end surfaces of a laminated body 15 obtained when the ceramic green sheets 11 and 12 are laminated.

Figure 5:
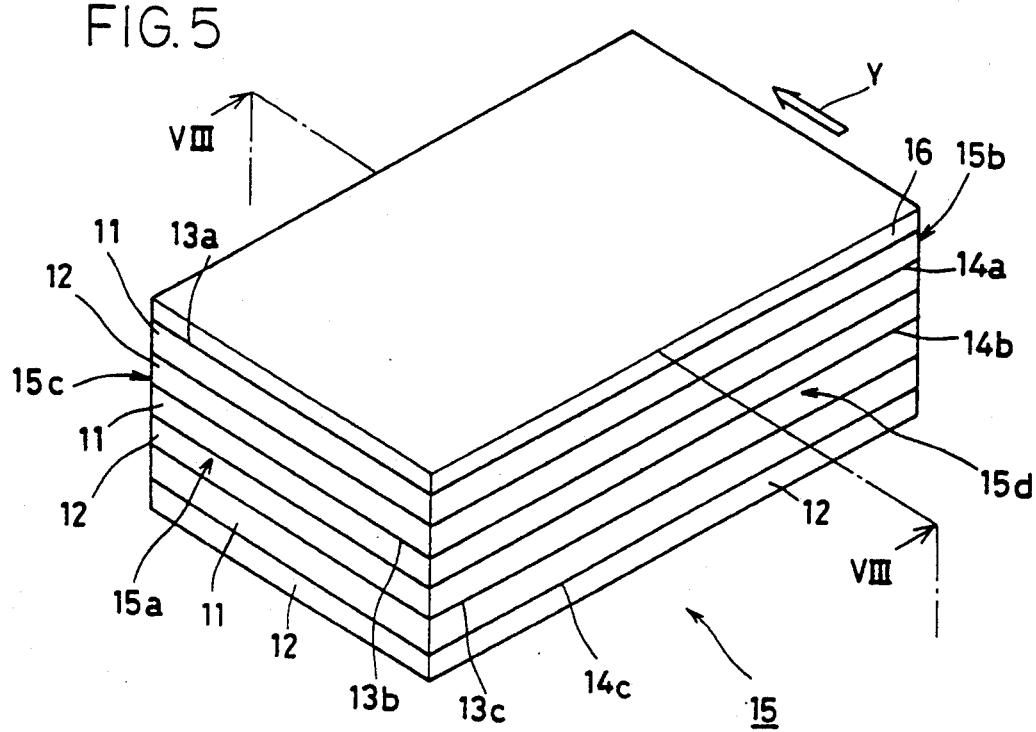
FIG. 5 is a perspective view showing a monolithic type dielectric green chip.

A plurality of ceramic green sheets 11 and 12 as shown in FIG. 4 are alternately laminated, thereby to make it possible to obtain a laminated body 15 shown in FIG. 5. In the laminated body 15, respective three first and second ceramic green sheets 11 and 12 are alternately laminated, and a suitable number of ceramic green sheets 16 having no inner electrode material layer provided thereto are further laminated in its uppermost part (also in its lowermost part, as required).

Herein, inner electrode material layers 13a to 13c on the three ceramic green sheets 11 are led out to a first end surface 15a of the laminated body 15, and inner electrode material layers 14a to 14c on the other three ceramic green sheets 12 are led out to a second end surface 15b thereof. Further, both the inner electrode material layers 13a to 13c and 14a to 14c are also exposed to side surfaces 15c and 15d of the laminated body 15. In obtaining the laminated body 15, it is preferable to use mother ceramic green sheets shown in FIG. 6 in the actual mass production process. More specifically, mother inner electrode material layers 18a and 18b leading from one edge 17a to the other edge 17b are formed spaced apart from each other by a predetermined distance on a rectangular mother ceramic green sheet 17 which is relatively large. Similarly, mother inner electrode material layers 20a and 20b are formed on a ceramic green sheet 19 serving as a mother dielectric sheet so as to lead from one edge 19a to the other edge 19b of the ceramic green sheet 19.

The ceramic green sheets 17 and 19 are alternately laminated in the direction as shown and cut along one dot and dash lines A and B, thereby to make it possible to obtain a lot of structures similar to that of the laminated body 15 shown in FIG. 5.

Thus, the mother ceramic green sheets 17 and 19 are utilized, thereby to make it possible to efficiently mass-produce the laminated body shown in FIG. 5. Further, in the laminated body 15 shown in FIG. 5, the inner electrode material layers 13a to 13c and 14a to 14c are formed to have such a width that they are exposed to the side surfaces 15c and 15d. Consequently, even if some shift occurs in the direction represented by an arrow C in FIG. 6 in laminating the ceramic green sheets 17 and 19 shown in FIG. 6, no shift in overlapping of the inner electrode materials occurs in the direction represented by the arrow C in the monolithic type dielectric body 15 obtained. Accordingly, even if some shift in lamination which could not be conventionally avoided occurs in laminating the mother ceramic green sheets 17 and 19, a laminated body 15 which does not largely vary in the overlapping area of its electrodes can be reliably obtained.

Figure 6:
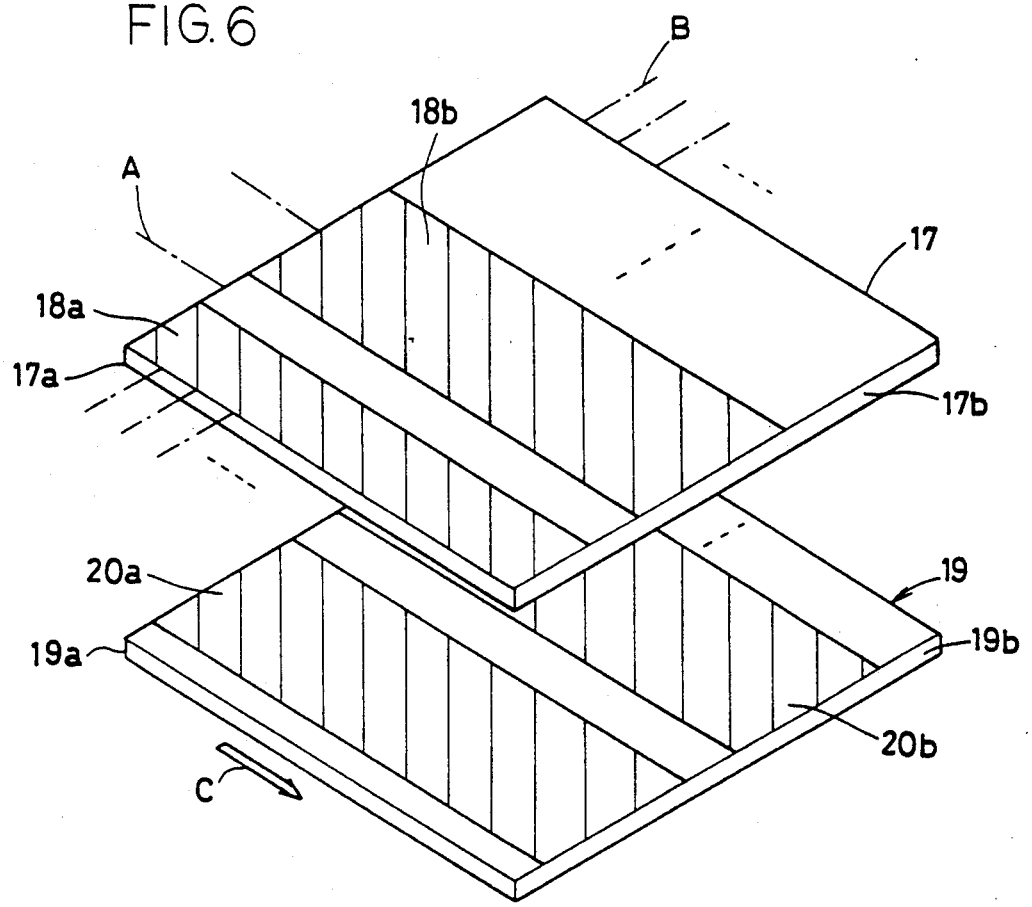
FIG. 6 is a perspective view for explaining the process of laminating mother ceramic green sheets.

If the laminated body 15 is obtained by cutting along the one dot and dash lines A and B in FIG. 6, the inner electrode material layers are liable to hang out of the side surfaces of the laminated body. However, such portions of the inner electrode material layers hanging out in this way are reliably removed by an etching material as described later.

Figure 1A:
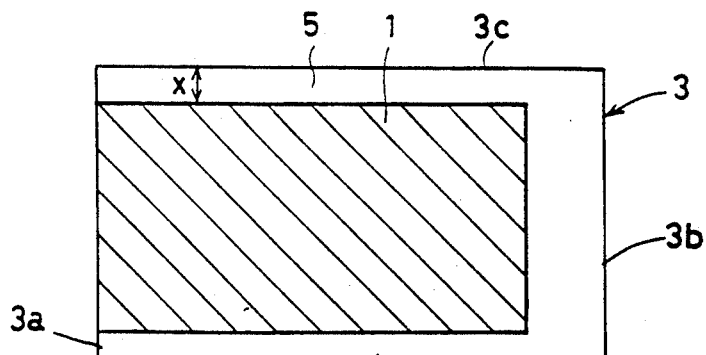
FIGS. 1A and 1B are plan views each showing the shape of a ceramic green sheet used for fabricating a conventional multilayer capacitor and an inner electrode material layer formed thereon.
Figure 7A:
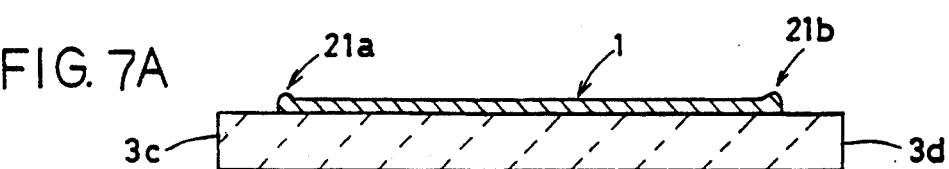
FIGS. 7A and 7B are cross sectional views for explaining the shapes of side edges of the inner electrode material layers in the conventional example and the present embodiment, respectively.

Moreover, in the conventional example shown in FIG. 1A, when conductive paste for composing an inner electrode material layer 1 is printed, lifted portions 21a and 21b are formed in side edges of the inner electrode material layer 1 by surface tension of the paste, as shown in FIG. 7A. As a result, when a plurality of ceramic green sheets are laminated, delamination is liable to occur after sintering because the thickness of the inner electrode material layer is not uniform.

Figure 7B:
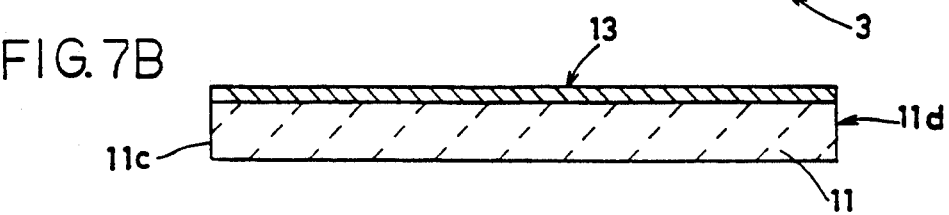

On the other hand, in the present embodiment, the inner electrode material layer 13 is formed over the entire width between the side edges 11c and 11d of the ceramic green sheet 11, as shown in a cross sectional view corresponding to FIG. 7B. Accordingly, the thickness of the inner electrode material layer 13 is made uniform in the direction of width, thereby to make it possible to effectively prevent occurrence of delamination caused by nonuniformity of the thickness of the inner electrode material layer.

Turning to FIG. 5, the laminated body 15 is pressed in the direction of thickness prior to firing. The ceramic green sheets are firmly bonded to each other by the pressing. In this case, in the process according to the present embodiment, the inner electrode material layers 13a to 13c and 14a to 14c are formed over the entire width between the side surfaces 15c and 15d of the laminated body 15. Accordingly, the ceramic green sheets can be pressed such that the thickness of the laminated body 15 is uniform in the Y direction in FIG. 5, as shown in FIG. 8B which is a typical cross sectional view taken along a line VIII—VIII in FIG. 5.

Figure 1B:
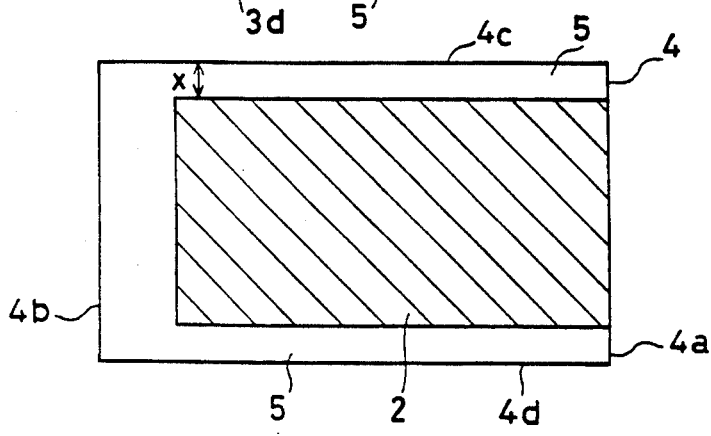

On the other hand, in the conventional example using a plurality of ceramic green sheets as shown in FIGS. 1A and 1B, side margin regions 5 have been previously formed. Accordingly, the thickness of the laminated body 10 is decreased at the portions Z where the side margin regions are formed, as shown in FIG. 8A. Consequently, delamination is liable to occur at the side surfaces of the sintered body obtained due to the difference between the thickness of the laminated body at the portions where the inner electrode material 1 and 2 are formed and the thickness thereof at the side portions Z where the side margin regions are formed.

Therefore, in the fabricating method according to the present embodiment, the occurrence of delamination caused by such reasons can be effectively prevented.

The laminated body 15 shown in FIG. 5 which was pressed in the direction of lamination is fired, to obtain a sintered body serving as a monolithic type dielectric body. Then, first and second end surfaces of the sintered body 25 obtained are coated with resist material layers 26a and 26b, as shown in FIG. 9. The resist material layers 26a and 26b are constituted by materials which are not attacked by etchant which can be used in etching as described later. As an example of the materials, synthetic resin such as epoxy resin can be used.

The above described inner electrode material layers are baked in the process of firing, ceramics so that inner electrodes 13a to 13c and 14a to 14c are formed in the sintered body 25. In this specification, the same reference numerals as those of the above described inner electrode material layers are assigned to the inner electrodes for purposes of this description.

The respective inner electrodes 13a to 13c and 14a to 14c are exposed to outer surface regions excluding portions coated with the resist materials 26a and 26b, that is, side surfaces 25c and 25d of the sintered body 25.

The side surfaces 25c and 25d of the above described sintered body 25 are then etched by an etchant capable of engraving the materials composing the inner electrodes 13a to 13c and 14a to 14c. As the etchant, a strong acid such as nitric acid can be used. If metal materials other than Cu and Ni are used as the inner electrode materials, however, a suitable etchant capable of etching such metal material papers is used.

Figure 10:
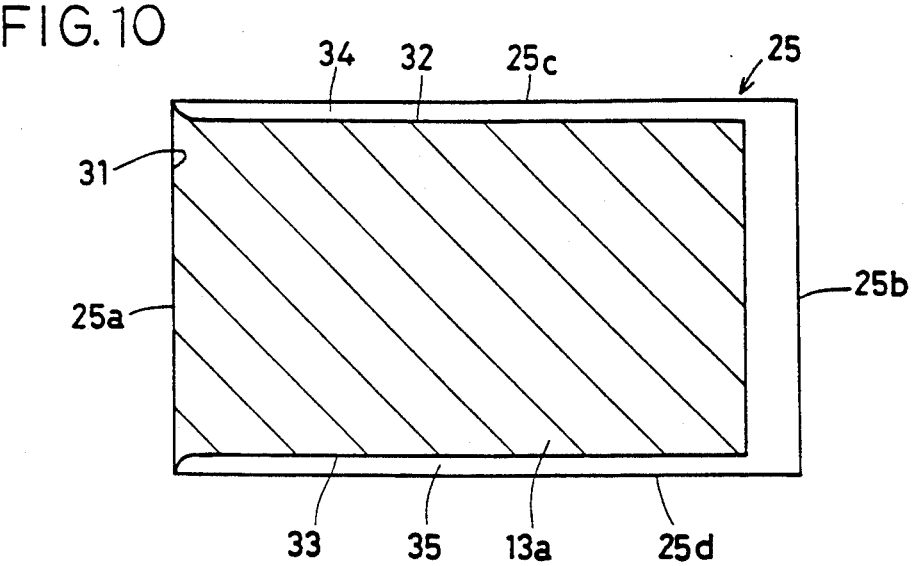
FIG. 10 is a schematic horizontal sectional view for explaining the shape of an inner electrode after etching.

The state after etching is shown in a schematic horizontal sectional view of FIG. 10. In FIG. 10, illustration of the resist materials 26a and 26b is omitted. As shown in FIG. 10, two sides 32 and 33 of the inner electrode 13a retreat inward from the side surfaces 25c and 25d such that side margin regions 34 and 35 are formed between the sides 32 and 33 and the side surfaces 25c and 25d. This means that both side edge portions of the inner electrode 13a are engraved by etching so that the side margin regions 34 and 35 are formed.

Side margin regions are similarly formed in portions of the other inner electrodes 13b, 13c and 14a to 14c.

Figure 11:
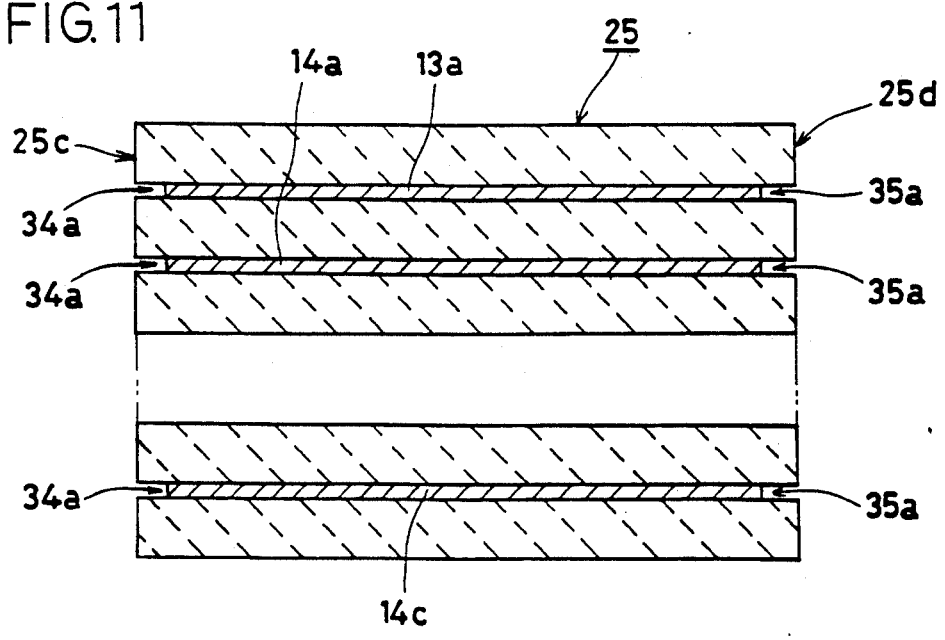
FIG. 11 is a schematic enlarged cross sectional view showing cavities formed by etching.

Thus, as shown in FIG. 11 which is a cross sectional view corresponding to a portion along the direction XI—XI in FIG. 9, cavities 34a and 35a are formed by ethcing in portions where the side margin regions are formed.

After etching, the sintered body 25 is washed off with water or the like to remove the etchant. However, in some cases, it is difficult to completely remove the remaining etchant, particularly etchant which remains in the cavities 34a and 35a, by only water-washing. In the present embodiment, the sintered body 25 is then placed under in a heating atmosphere, to remove the remaining etchant by evaporation.

Alternatively, the above described heating may utilize heat applied in the process of baking outer electrodes as described later. In that case, it is possible to remove the remaining etchant and bake the outer electrodes in the same process.

The purpose of the removal of the remaining etchant is for preventing corrosion of the inner electrodes due to the remaining etchant. Consequently, a method other than heating may be used provided that all etching agent must be removed from the product. For example, the remaining etchant may be dipped into an alkali solution to be neutralized provided that it is an etchant made of a strong acid.

The resist material layers 26a and 26b are removed subsequently to the removal of the above described remaining etchant. The resist material layers 26a and 26b can be removed by, for example, a method using mechanical grinding or a chemical agent.

In the present embodiment, the side margin regions 34 and 35 are formed by etching. Accordingly, side margin regions having an accurate width can be formed inward from the side surfaces 25c and 25d of the sintered body 25. Moreover, the side margin regions 34 and 35 are formed after laminating the ceramic green sheets and the inner electrode material layers to obtain a laminated body. Accordingly, it is not necessary to form side margin regions having an extra width to avoid the risk of the shift in lamination or the like. More specifically, the side margin regions 34 and 35 can be formed to have a smaller width than that in the conventional example. Consequently, it is found that a multilayer capacitor small in size and large in capacitance can be achieved.

Furthermore, it is also possible to easily adjust the width of the side margin regions by selecting the length of time for the above described etching.

Additionally, the inner electrode portions exposed to the side surfaces are removed by the etching process. Accordingly, even if the inner electrode material layers hang from the exposed portions on the side surfaces of the laminated body 15, such portions that hang out can be reliably removed.

Figure 3:
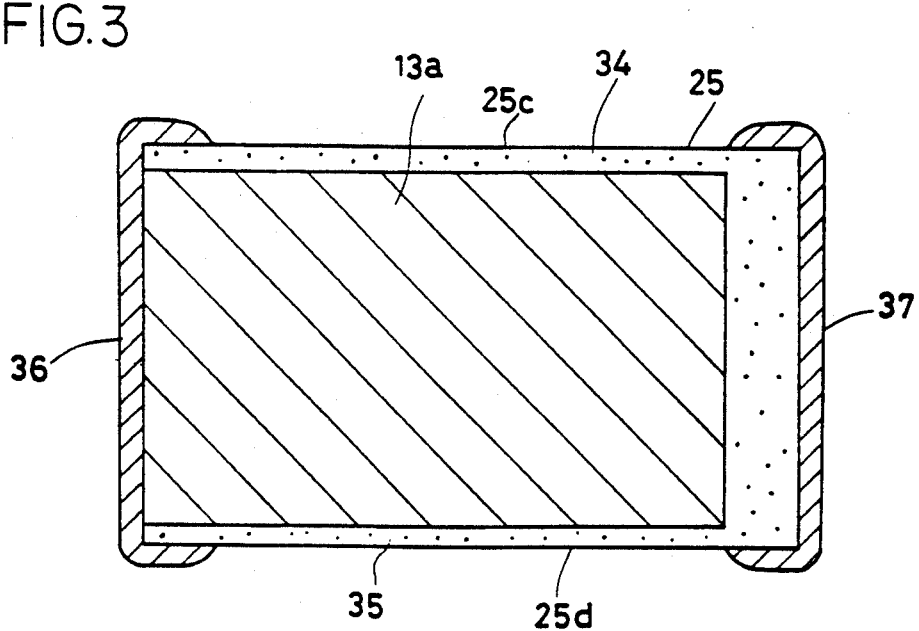
FIG. 3 is a horizontal sectional view showing a multilayer capacitor according to a first embodiment of the present invention.
Figure 2A:
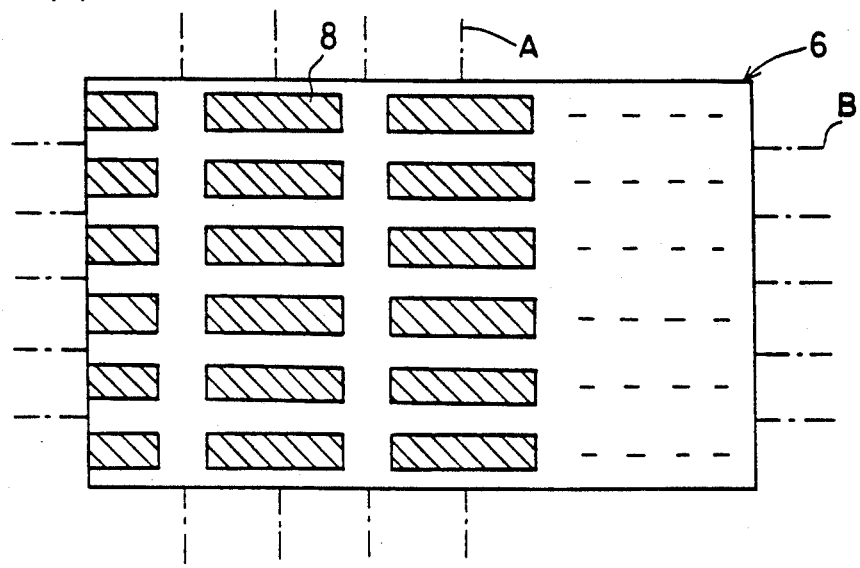
FIGS. 2A and 2B are plan views for explaining the shapes of a mother ceramic green sheet used in mass-producing the conventional multilayer capacitor and mother inner electrode material formed thereon.
Figure 2B:
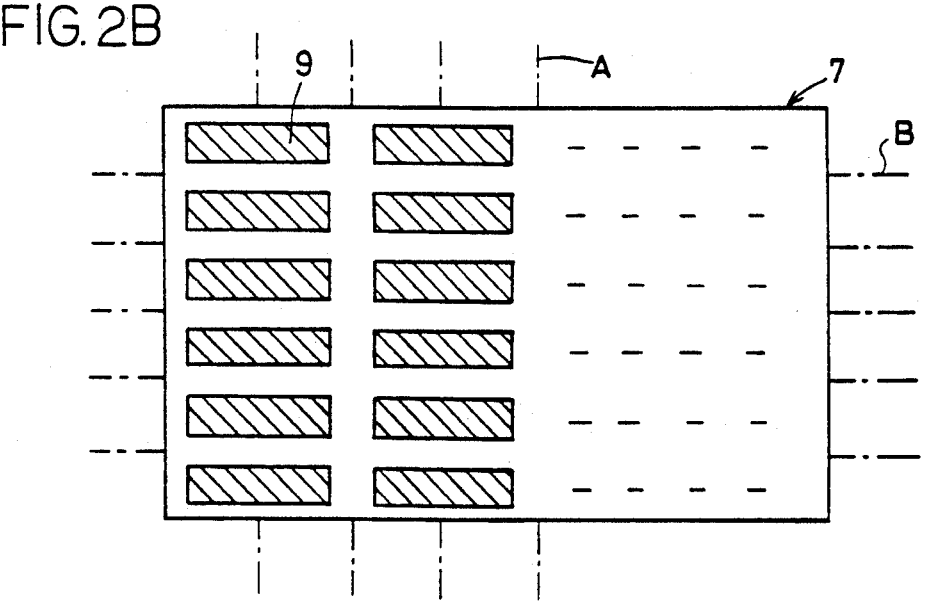
Figure 12:
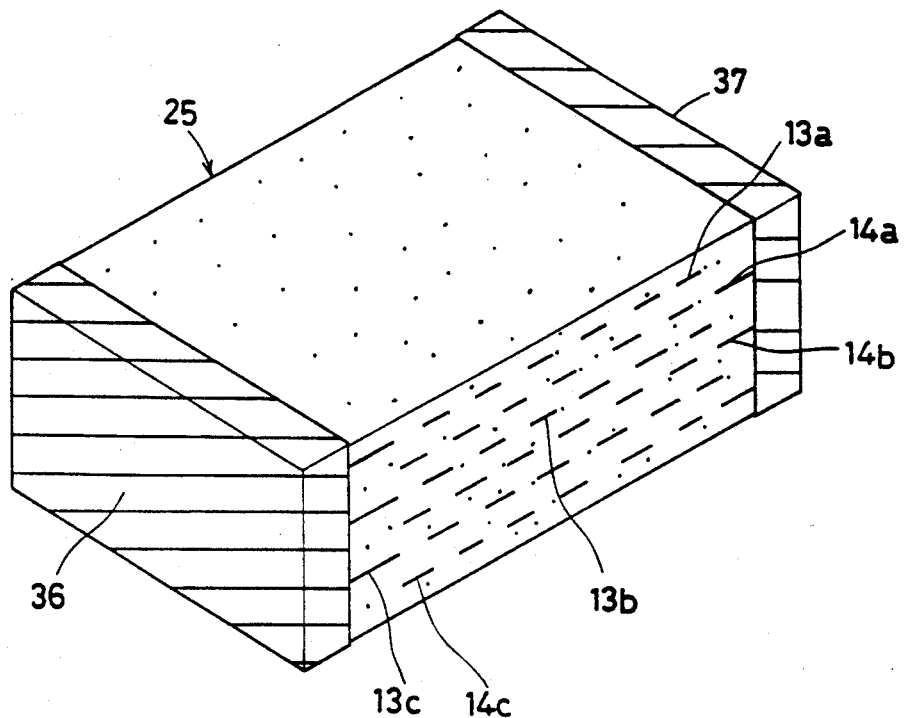
FIG. 12 is a perspective view showing a multilayer capacitor according to the first embodiment of the present invention.

Finally, conductive paste mainly composed of, for example, Ag is applied to surfaces from which the resist material layers 26a and 26b are removed and baked, thereby to form a pair of outer electrodes 36 and 37, as shown in FIGS. 3 and 12. The outer electrodes 36 and 37 are electrically connected to the inner electrodes 13a to 13c and 14a to 14c, respectively.

Preferably, the side surfaces 25c and 25d of the sintered body 25 may be subjected to oxidation processing after forming the outer electrodes 36 and 37. The oxidation processing is achieved by, for example, subjecting the multilayer capacitor shown in FIG. 12 to heating processing in an oxidation atmosphere for a predetermined time period. In the present embodiment, when the side margin regions 34 and 35 are formed by etching, side edges of the inner electrodes 13a to 13c and 14a to 14c are also formed, and are spaced by the side margin regions 34 and 35 having a relatively small width from the side surfaces 25c and 25d of the sintered body 25. Accordingly, the side edges of the inner electrodes are liable to be oxidized by the oxidation atmosphere, thereby to form oxide films in the side edges of the inner electrodes. The formation of the oxide films causes the adhesive strength between the inner electrodes and ceramics to be effectively increased. This is because a chemical bond is established between dielectric ceramics and the inner electrodes by the oxidation.

Accordingly, it becomes possible to further increase adhesive properties between the inner electrodes 13a to 13c and 14a to 14c and dielectric ceramics by performing the above described oxidation processing.

The above described oxidation processing may be performed prior to the formation of the outer electrodes 36 and 37 provided that it is performed after the formation of the side margin regions 34 and 35 by etching.

Figure 13:
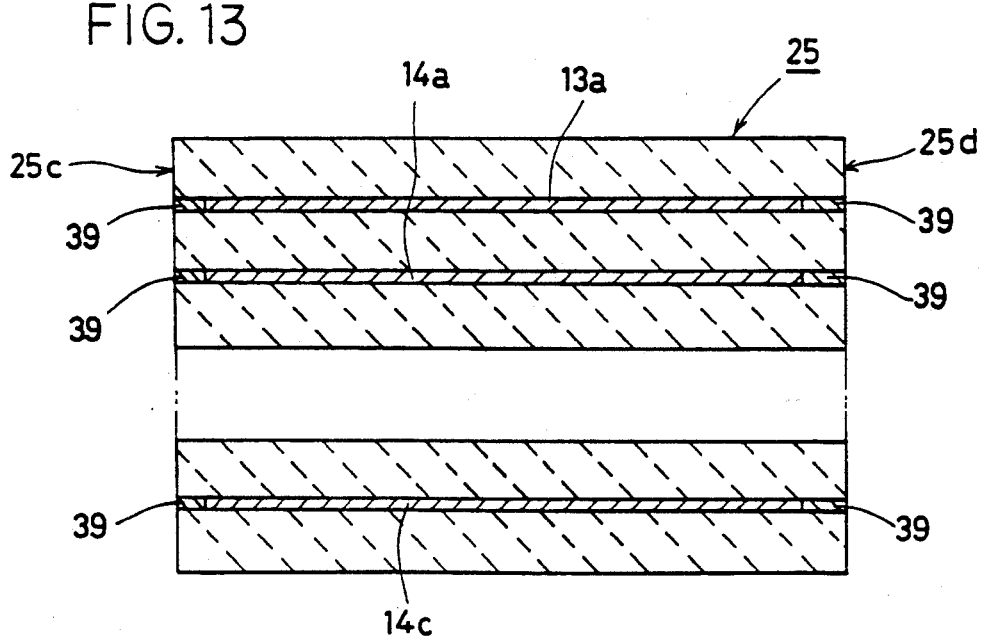
FIG. 13 is a cross sectional view showing a state where the cavities are filled with sealing materials.

Furthermore, the side surfaces 25c and 25d of the sintered body 25 can be preferably sealed by injecting a synthetic resin 39 such as epoxy resin by applying pressure to the cavities 34a and 35a shown in FIG. 11, as shown in FIG. 13. As a sealing material, an arbitrary material such as rubber can be used in addition to the synthetic resin.

Additionally, although in the above described embodiment, the pair of outer electrodes 36 and 37 is formed after etching, the outer electrodes may be formed prior to etching.

In the above described embodiment, since the inner electrodes 13a and 13c and 14a and 14c are constructed by using low-cost Ni or Cu, the cost of the electrodes can be reduced. In addition, since mother ceramic green sheets can be laminated without excessively worrying about a shift in lamination or the like, the fabricating processes are simplified, thereby to make it possible to effectively reduce the mass production cost of the multilayer capacitor.

Preferably, by coating the side surfaces of the sintered body where the outer electrodes 36 and 37 are to be formed, with conductive paste mainly composed of Ni, and then, forming the outer electrodes 36 and 37 are formed, the reliability of the electrical connection between the inner electrodes and the outer electrodes can be increased. In addition, the side surfaces 25a and 25b of the sintered body 25 may be coated with other conductive materials in place of Ni. Further, if materials which are not engraved by etchant are used as the precoating materials before forming the outer electrodes, the precoating materials may perform the function of the above described resist materials 26a and 26b. More specifically, the resist materials 26a and 26b can be constituted by the precoating placed on the sintered body 25 before forming outer electrodes of a material such as Ni paste.

The actual etching can be performed dipping the sintered body in etchant, or storing etchant in a rotating barrel, putting the sintered body into the barrel and rotating the barrel.

Figure 14:
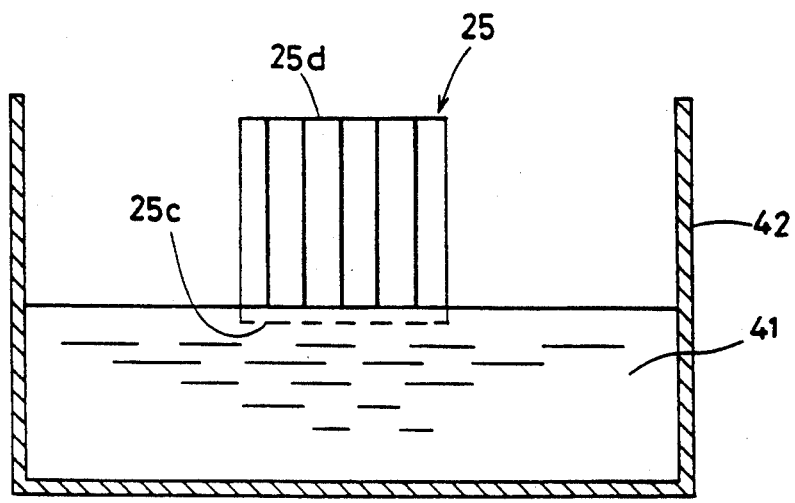
FIG. 14 is a cross sectional view for explaining an example of the etching process.

Additionally, as shown in a cross sectional view of FIG. 14, etching may be performed by dipping only the side surfaces 25c and 25d of the sintered body 25 in a tub 42 in which etchant 41 is stored. In this case, etching can be carried out while preventing etchant from being affixed to other outer surface portions of the sintered body by dipping the side surfaces 25c and 25d into the etchant in that order. Consequently, the use of the above described resist material 26a and 26b can be omitted.

Second embodiment

Figure 15:
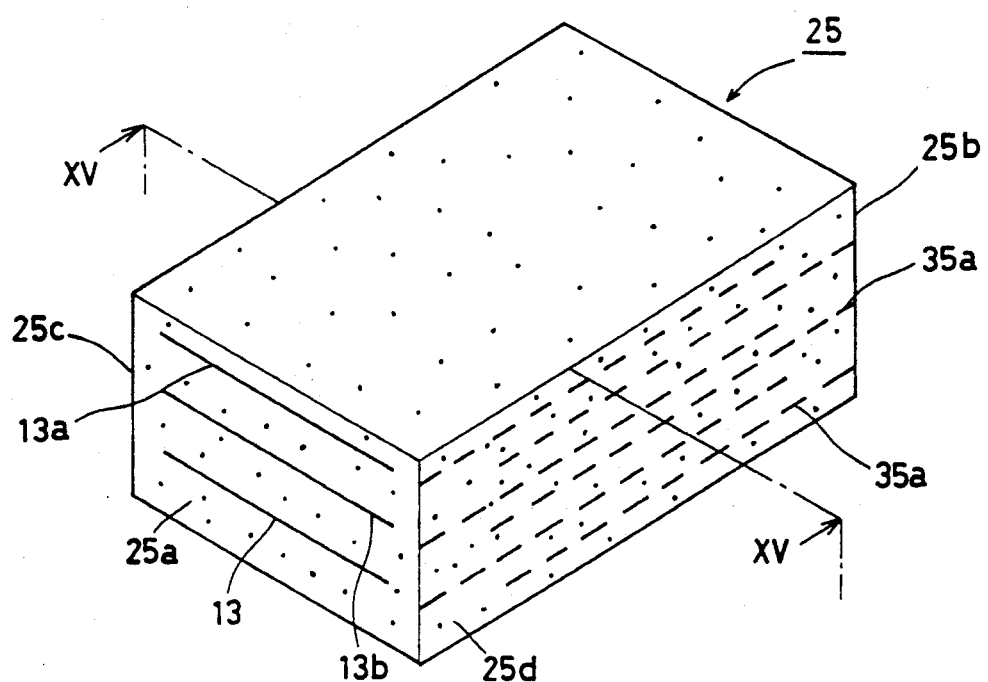
FIG. 15 is a perspective view showing a monolithic type dielectric body from which resist materials are removed after etching in a second embodiment of the present invention.
Figure 16:
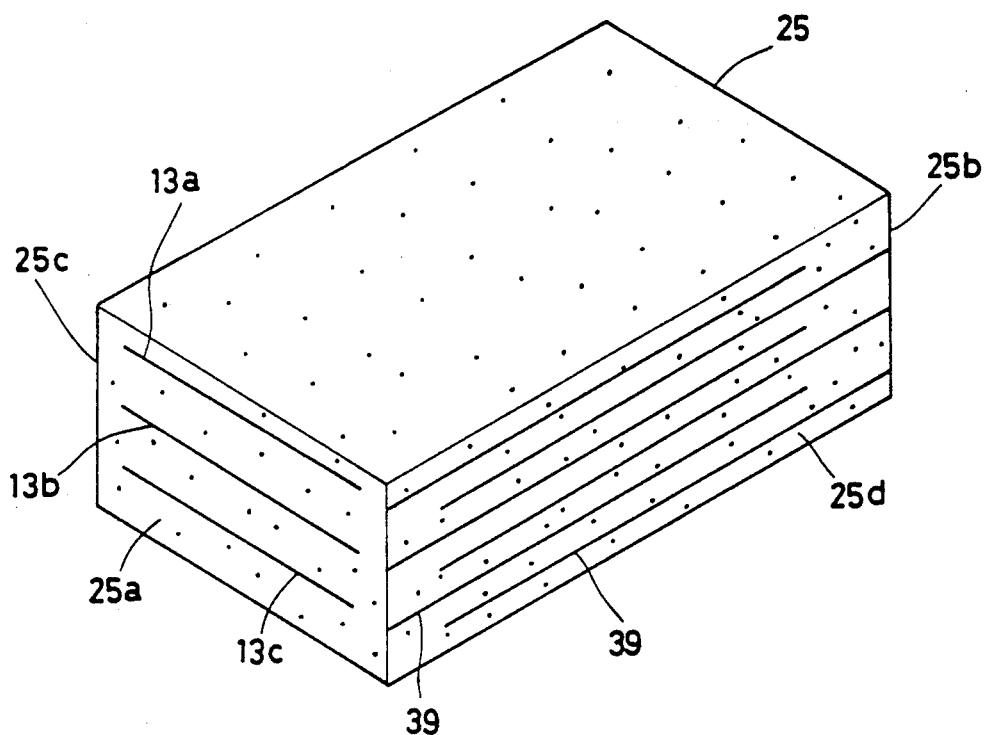
FIG. 16 is a perspective view showing a state where cavities formed by etching are filled with resin.
Figure 17:
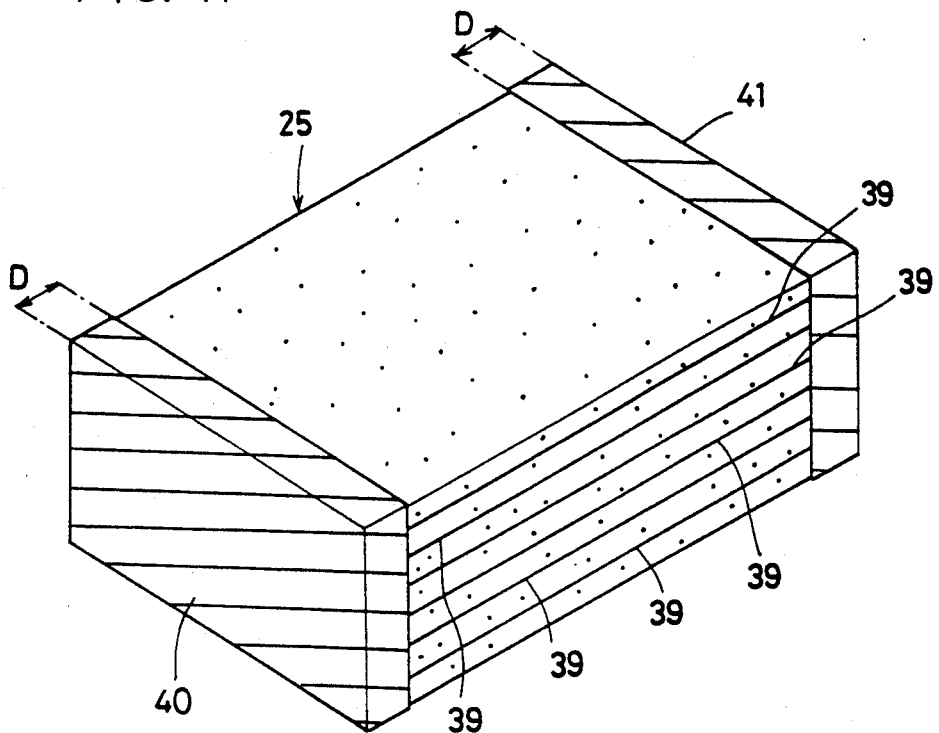
FIG. 17 is a perspective view showing a multilayer capacitor obtained in the second embodiment of the present invention.

Referring to FIGS. 15 to 17, a method of fabricating a multilayer capacitor according to a second embodiment of the present invention will be described.

In this fabricating method according to the second embodiment, a sintered body 25 shown in FIG. 9 is prepared and resist material layers 26a and 26b are provided on both end surfaces thereof, in the same manner as in the first embodiment. The same etching as that in the first embodiment is carried out to etch inner electrodes 13a to 13c and 14a to 14c and then, the resist materials 26a and 26b are removed. In such a manner, a sintered body 25 shown in FIG. 15 is obtained.

The fabricating method according to the second embodiment differs from the method according to the first embodiment in terms of the processes after obtaining the sintered body 25 shown in FIG. 15. More specifically, in the second embodiment, the sintered body 25 having cavities 35a formed by etching is filled with synthetic resin 39 serving as a sealing material prior to forming outer electrodes, as shown in FIG. 16.

As shown in a perspective view of FIG. 17, a pair of outer electrodes 40 and 41 are formed so as to cover at least first and second end surfaces of the sintered body 25, thereby to obtain a multilayer capacitor.

In the second embodiment, the cavities formed after forming side margin regions are filled with the resin 39, thereby to make it possible to reliably prevent the outer electrodes 40 and 41 and the inner electrodes connected to the outer electrodes 41 and 40 from being short-circuited after the outer electrodes 40 and 41 are formed. For example, a short of the inner electrode 13a (see FIG. 15) to the outer electrode 41 is prevented by the resin 39 with which the cavities are filled as described above.

Consequently, the fabricating method according to the second embodiment is preferable because the cavities are filled with the resin 39 prior to forming the outer electrodes 40 and 41 so that the outer electrodes 40 and 41 can be formed without considering the overlapping area which is represented by D in FIG. 17, of the outer electrodes 40 and 41 with the side surfaces of the sintered body 25.

When the above described etching process is carried out after forming the outer electrodes 40 and 41, it is difficult to etch certain regions of the inner electrodes, namely those regions, which are covered with portions leading to the side surfaces which are covered by the sintered body, of the outer electrodes 40 and 41. In the fabricating method according to the second embodiment, however, such etching difficulties easily made.

The above described synthetic resin 39 may be one which burns and disappears in baking the outer electrodes 40 and 41. In this case, the inner electrodes 13a to 13c and the 14a to 14c and conductive paste for forming the outer electrodes are separated from each other by the synthetic resin 39. Accordingly, after baking the outer electrodes 40 and 41, an outer electrode 41 or 40 and an inner electrode 13a to 13c or 14a to 14c are protected from short-circuited on the side of the side surfaces 25c and 25d of the sintered body. The resin 39 disappears by baking the outer electrodes 40 and 41. Accordingly, a resin superior in moisture resistance and insulating characteristics may then be sealed again in the cavities as required.

Third embodiment

Figure 17A:
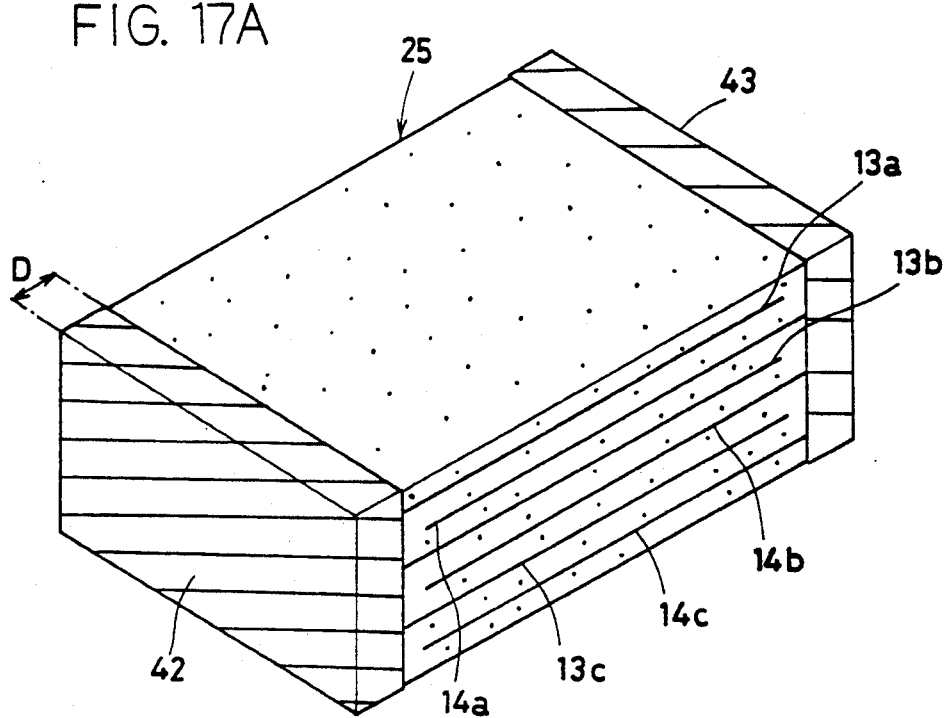
FIG. 17A is a perspective view showing a state where outer electrodes are formed in a monolithic type dielectric body prepared in a third embodiment of the present invention.

Referring now to FIG. 17A, description is made of a fabricating method according to a third embodiment of the present invention. The fabricating method according to the third embodiment is characterized in that the etching process for forming the side margin regions is carried out after forming the outer electrodes.

More specifically, as shown in a perspective view of FIG. 17A, a pair of outer electrodes 42 and 43 are first formed after obtaining a sintered body 25 provided with inner electrodes 13a to 13c and 14a to 14c. In this case, the overlap area D of the outer electrodes 42 and 43 with the side surfaces of the sintered body 25 must be such a distance that one of the outer electrodes 42 and 43 respectively does not come into contact with the inner electrodes 14a to 14c and 13a to 13c connected to the outer electrode 43 and 42 on the other side. Thus, if the covering size D of the outer electrodes 42 and 43 is controlled, side margin regions can be formed by first forming the outer electrodes 42 and 43 and then, performing etching processing in the same manner as performed in the above described first and second embodiments. Cavities formed by forming the side margin regions are filled with synthetic resin serving as a sealing material in the same manner as those described in the first and second embodiments, thereby to make it possible to obtain a multilayer capacitor superior in reliability.

If the outer electrodes are formed after etching the sintered body 25 to form the side margin regions, outer electrode materials may enter the sintered body 25 through the cavities formed by etching. Accordingly, there are possibilities of undesired short circuits between the inner electrodes, and of a outer electrodes and the decrease in the withstand voltage. On the other hand, in the fabricating method according to the present embodiment, the side margin regions are formed by etching after forming the outer electrodes 42 and 43. Accordingly, the possibilities of such short circuits and of a decrease in insulating withstand voltage are small.

Fourth embodiment

Figure 18A:
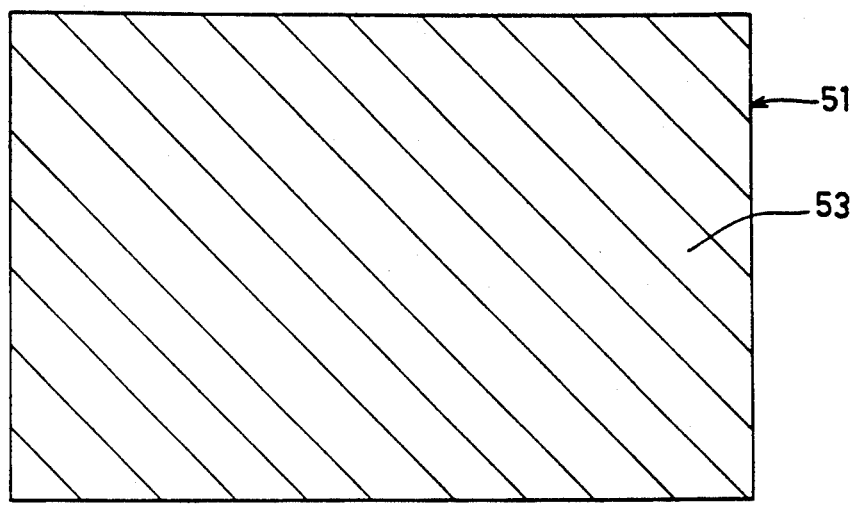
FIGS. 18A and 18B are plan views for explaining the shapes in printing of a mother ceramic green sheet used in a fourth embodiment of the present invention and inner electrode materials formed thereon.
Figure 18B:
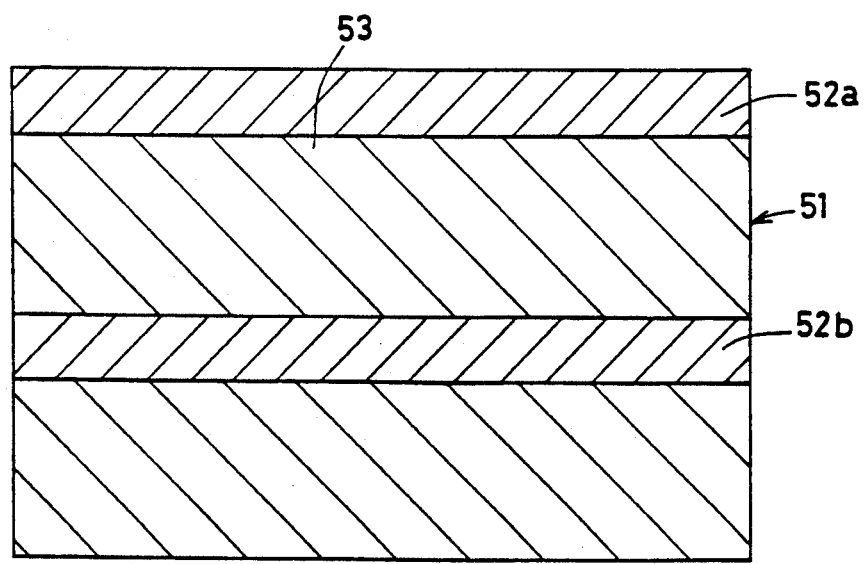

FIGS. 18A and 18B are plan views for explaining the shapes in printing of a mother ceramic green sheet used in a fabricating method according to a fourth embodiment and mother inner electrode material layers formed on its upper surface.

First, a rectangular mother ceramic green sheet 51 (FIG. 18A) is prepared. An inner electrode material layer 53 comprising an easy etching material is printed on the entire upper surface of the mother ceramic green sheet 51 (FIG. 18A). The printing of the inner electrode material layer 53 may be done on the entire surface and thus, can be done without requiring complicated positioning work or the like at the time of printing.

Then, inner layers electrode material 52a and 52b comprising a difficult etching material are printed in parallel with predetermined spacing, as shown in FIG. 18B.

The above described inner electrode material layers 52a and 52b constitute a first inner electrode material layer, and the inner electrode material layer 53 printed on the entire surface constitutes a second inner electrode material layer. The first inner electrode material layer 52a and 52b are constituted by materials which are not easily engraved by a chemical agent for etching used in the etching process as described later. On the other hand, the second inner electrode material 53 is constituted by a material layer which is easily etched by the chemical agent for etching.

Figure 19:
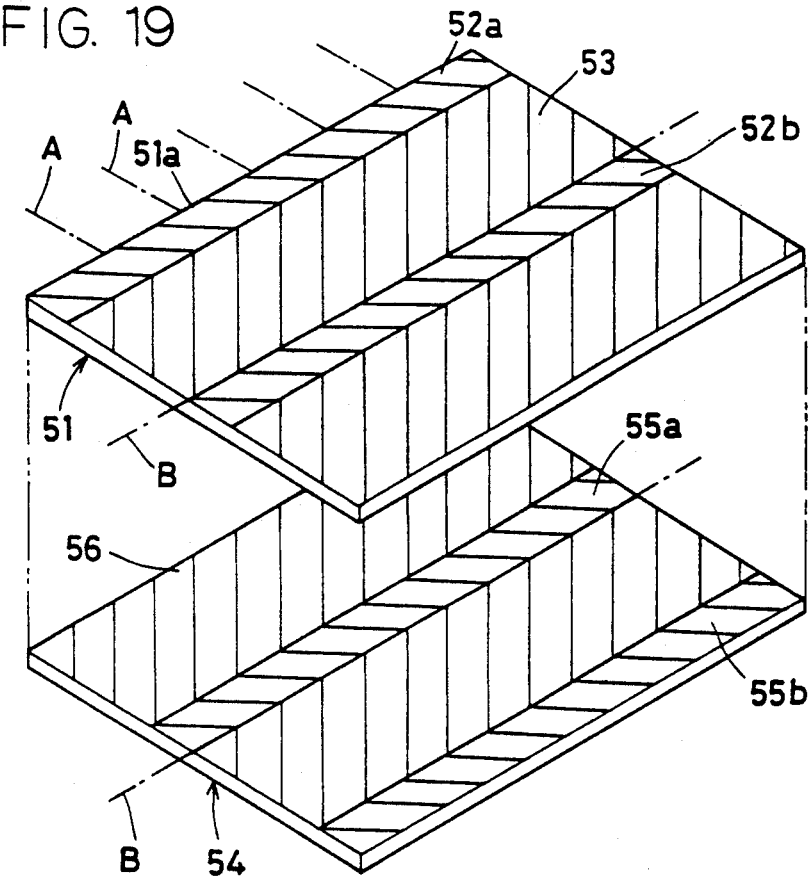
FIG. 19 is a perspective view for explaining the laminating process.

Then, a plurality of ceramic green sheets 51 as shown in FIG. 18B are prepared and laminated with alternate sheets being alternately reversed by 180°. This will be described with reference to FIG. 19. In FIG. 19, for easy understanding, different reference numerals are assigned to the reversed ceramic green sheets. More specifically, a second outer electrode material layer 56 is printed on the entire surface of a mother ceramic green sheet 54 arranged below the mother ceramic green sheet 51, and two first inner electrode material layers 55a and 55b are printed in a strip shape in parallel on the upper surface thereof.

Figure 20:
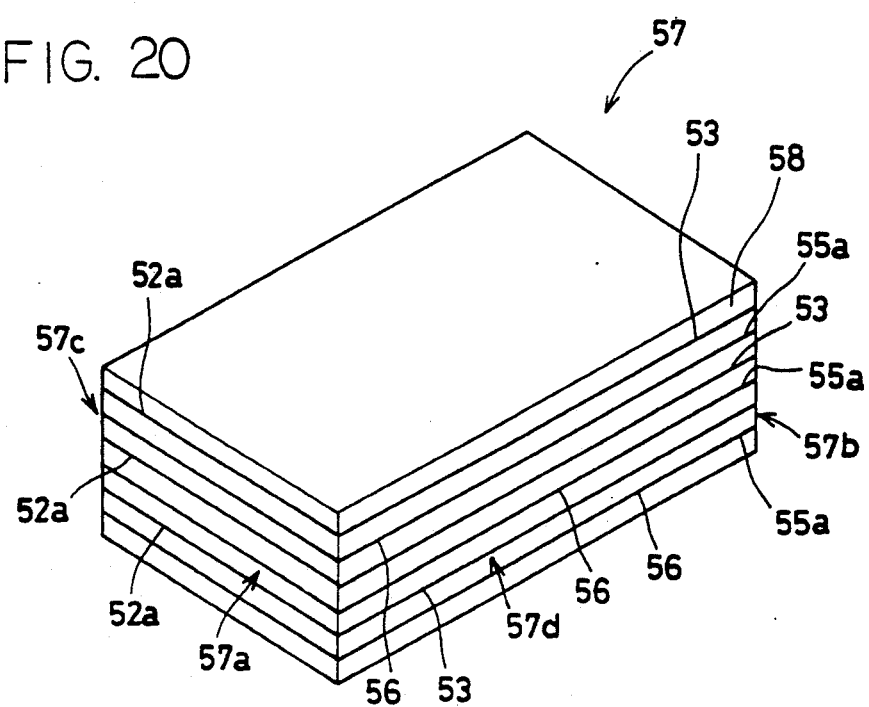
FIG. 20 is a perspective view showing a monolithic type dielectric green chip.

A plurality of mother ceramic green sheets 51 and 54 as described above are alternately laminated and cut along one dot and dash lines A and B shown in FIG. 19, thereby to obtain a monolithic type dielectric green chip 57 shown in FIG. 20.

Alternatively in the fabricating method according to the present embodiment, a laminated body may be cut in portions along one dot and dash lines A and B shown in FIG. 19, to obtain individual dielectric green chips 57. Consequently, the laminated body need not be previously cut in consideration of the width of side margin regions. Accordingly, the dielectric green chip 57 can be obtained very simply and stably.

In the dielectric green chip 57, a ceramic green sheet 58 having no inner electrode material provided thereon is laminated on its uppermost layer.

First inner electrode material layers 52a and first inner electrode material layers 55a are respectively exposed to a first end surface 57a and a second end surface 57b of the monolithic type dielectric green chip 57. In addition, second inner electrode material layers 53 and 56 have the same width as that of the ceramic green sheet layer and thus, are exposed to not only the first and second end surfaces 57a and 57b but also both side surfaces 57c and 57d of the dielectric green chip 57.

The dielectric green chip 57 is then pressed in the direction of thickness, to increase adhesive properties between the ceramic green sheets. In this pressing step, the inner electrode material layers 53, 56, 52a and 55a are overlapped with each other over the entire surface area of the chip, considering the dielectric green chip 57 as viewed from the top, so that the entire surface of the dielectric green chip 57 is pressed at considerably large pressure for pressing the same. Consequently, a precise sintered body can be obtained in which delamination does not easily occur at the time of firing.

Figure 21A:
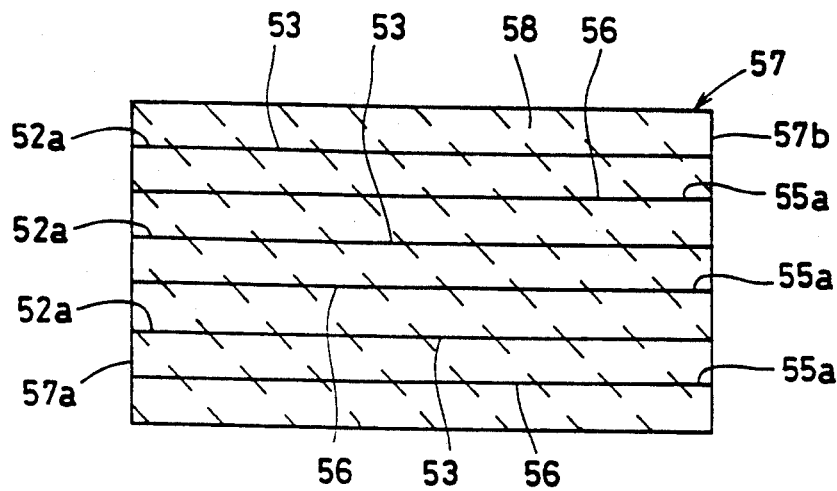
FIGS. 21A and 21B are respectively a sectional side elevation view and a horizontal sectional view showing the dielectric green chip shown in FIG. 20.
Figure 21B:
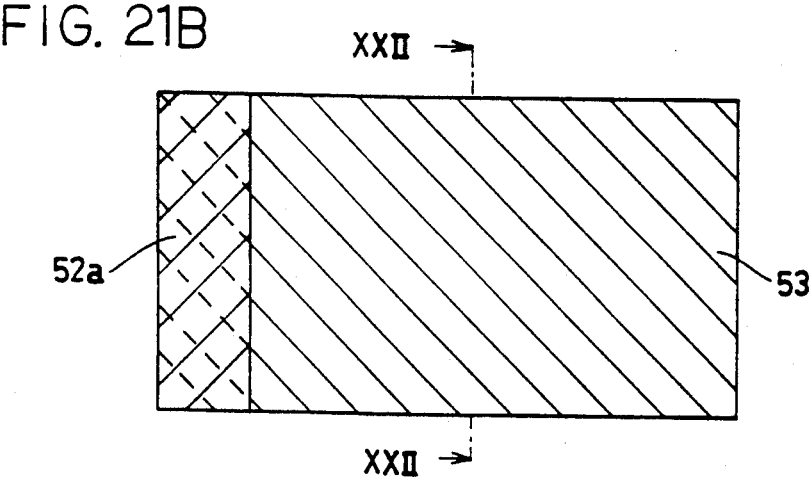
Figure 22:
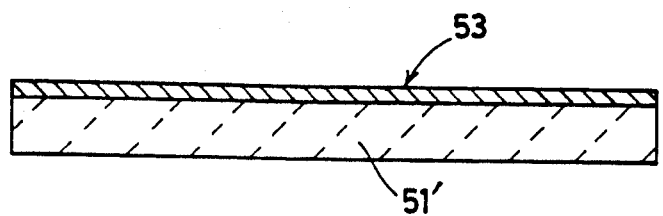
FIG. 22 is a cross sectional view for explaining the shapes of side edges of a second inner electrode material layer in the fourth embodiment, which corresponds to a portion taken along a line XXII—XXII in FIG. 21B.

Furthermore, as seen in FIG. 22 which is a typical portion cross sectional view taken along a line XXII—XXII shown in FIG. 21B, the second inner electrode material layer 53 is formed over the entire width of a ceramic green sheet 51'. Accordingly, the thickness of the inner electrode material layer 53 is uniform in the direction of width. Consequently, occurrence of delamination caused by nonuniformity of the thickness in the direction of width can be effectively prevented in the same manner as that in the first embodiment.

Figure 23A:
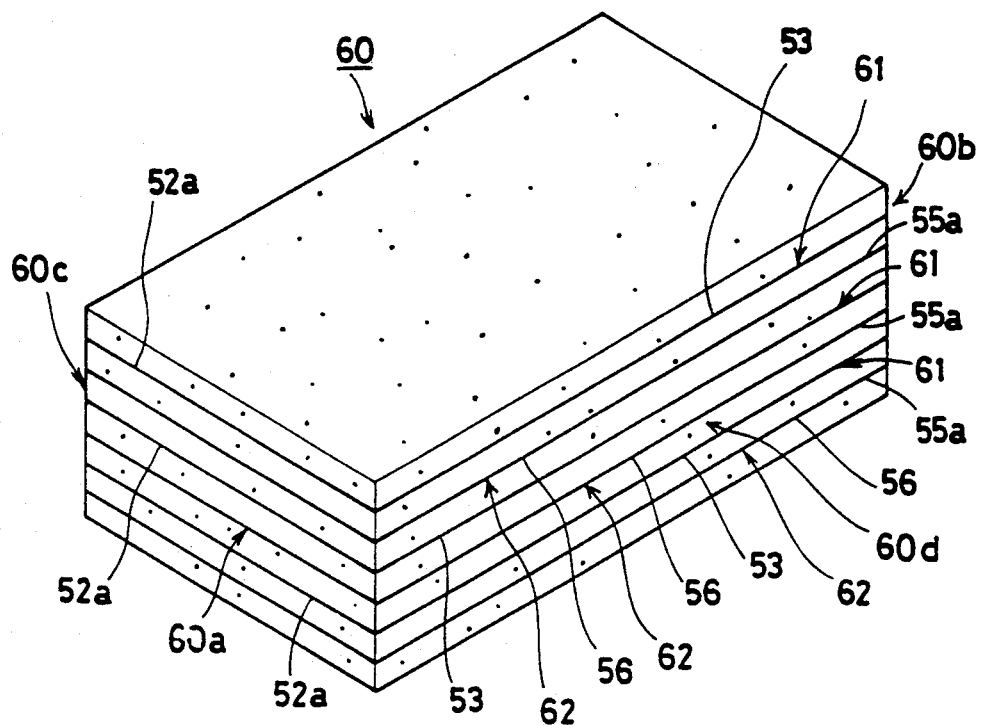
FIGS. 23A and 23B are perspective views respectively showing a monolithic type dielectric body obtained in the fourth embodiment and the dielectric body after etching.

The pressed dielectric green chip 57 is then fired, thereby to obtain a sintered body 60 shown in FIG. 23A. In the sintered body 60, a plurality of inner electrodes 61 and 62 are arranged so as to be overlapped with each other in the direction of thickness while being separated by dielectric ceramic layers. A first inner electrode portion 52a is exposed to a first end surface 60a (part of the inner electrode 61), while a first inner electrode portion 55a is exposed to a second end surface 60b (part of the inner electrode 62).

On the other hand, second inner electrode portions 53 and 56 in the inner electrodes 61 and 62 are exposed to the first and second end surfaces 60a and 60b and both side surfaces 60c and 60d.

More specifically, a plurality of inner electrodes 61 and 62 are so arranged that the first inner electrode portions 52a and 55a are alternately exposed to the first and second end surfaces 60a and 60b.

Figure 23B:
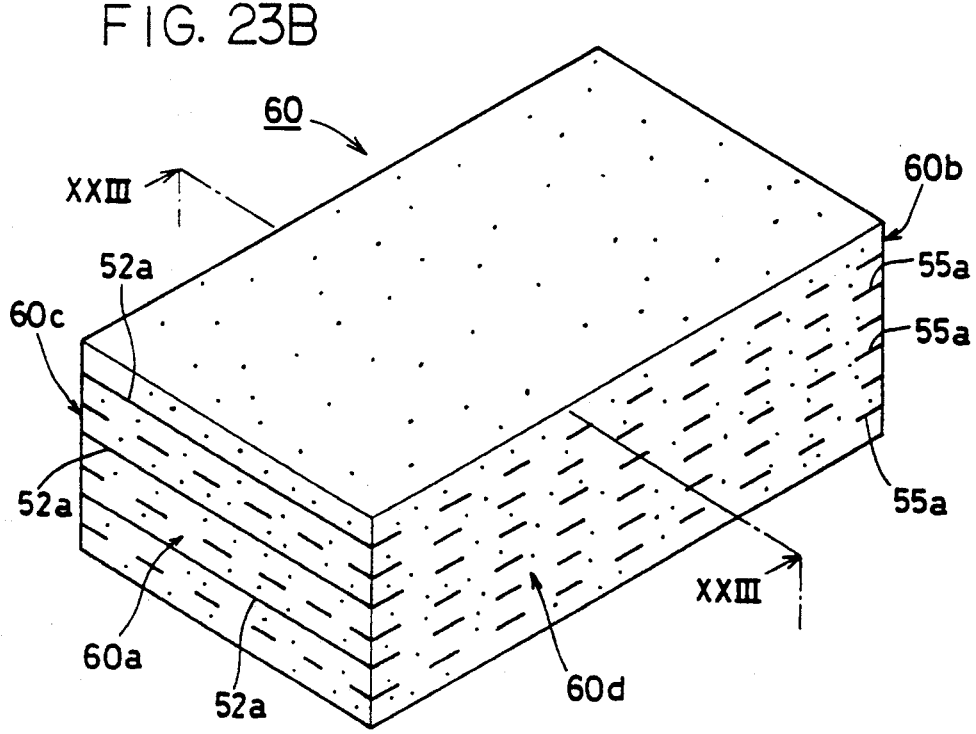

The sintered body 60 is then dipped into a chemical agent for selectively engraving the second inner electrode portions 53 and 56, to perform etching. The state after etching is shown in a perspective view of FIG. 23B. A cross section taken along a line XXIII—XXIII shown in FIG. 23B is shown by the same cross sectional view as FIG. 11 shown in the first embodiment and hence, the illustration thereof is omitted. More specifically, side edges of the second inner electrode portions 53 and 56 exposed to the end surfaces 60a and 60b and the side surfaces 60c and 60d of the sintered body and their vicinities are removed by etching. That is, side margin regions are formed in the side parts of the second inner electrode portions 53 and 56 by this etching. In this case, the first inner electrode portions 52a and 55a are not engraved by etching. More specifically, in the case of the above described etching, a chemical agent for selectively engraving only the second inner electrode portions 53 and 56 is used.

Thus, in the fourth embodiment, the side margin regions having a required width can be accurately formed by the above described etching process irrespective of the laminating process before sintering, thereby to make it possible to obtain a small-sized and large capacity multilayer capacitor as in the first to third embodiments.

Figure 24:
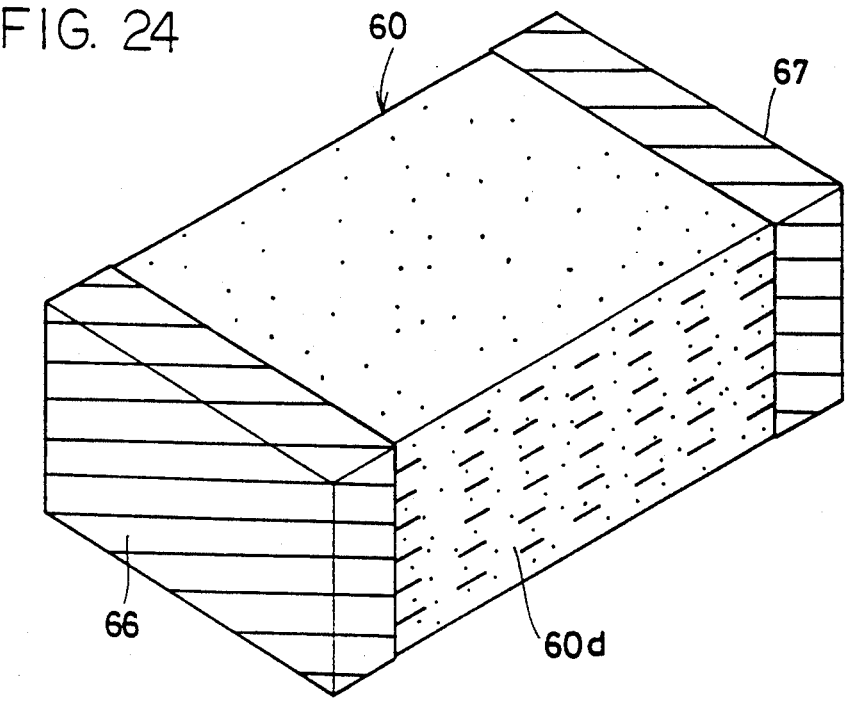
FIG. 24 is a perspective view showing a monolithic type dielectric body having inner electrodes formed therein.

Then, as shown in FIG. 24, outer electrodes 66 and 67 are formed on both end surfaces of the above described sintered body 60. Further, cavities that are formed where the above described side margin regions are formed on the side surfaces of the sintered body 60 are filled with sealing materials as required, thereby to make it possible to obtain a multilayer capacitor having the same structure as those in the first to third embodiments.

Figure 25A:
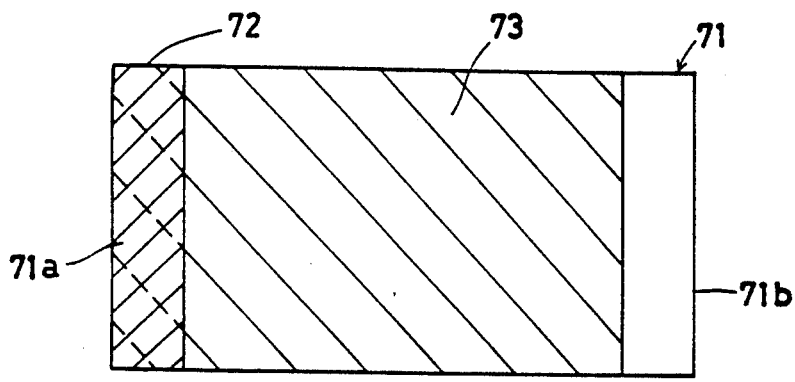
FIGS. 25A and 25B are plan views for explaining another example of the shapes in printing of a ceramic green sheet which can be used in the fourth embodiment and an inner electrode.
Figure 25B:
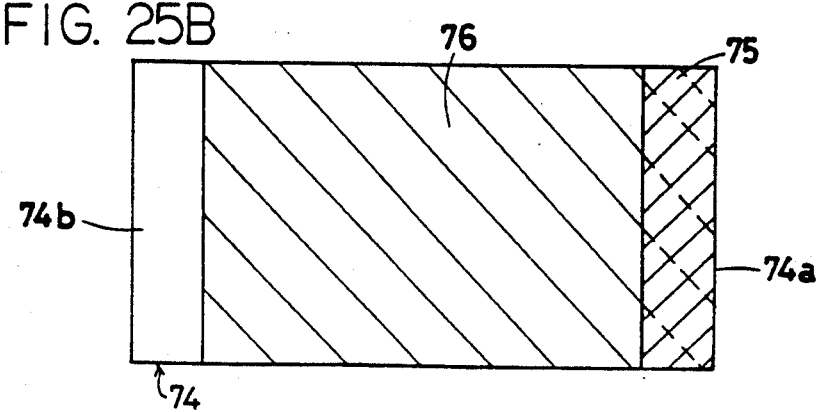

FIGS. 25A and 25B are plan views for explaining modified examples of the shapes in printing of a ceramic green sheet used in the fourth embodiment and inner electrode paste formed thereon.

As shown in FIG. 25A, a rectangular ceramic green sheet 71 is prepared on which a second inner electrode material 73 comprising an easy etching material layer is printed so as to extend from one edge 71a to the other edge 71b. In this case, the second inner electrode material layer 73 has such a length that it does not lead to the other edge 71b of the ceramic green sheet 71. Then, a first inner electrode material layer 72 comprising a difficult etching material is printed in a region in the vicinity of the one edge 71a. Similarly, as shown in FIG. 25B, a ceramic green sheet 74 is prepared on which first and second inner electrode material layers 75 and 76 are printed with their positions being reverse to those on the ceramic green sheet 71.

A dielectric green chip may be obtained by alternately laminating a plurality of ceramic green sheets 71 and 74 and laminating ceramic green sheets having no electrode paste printed thereon on its uppermost and lowermost parts as required. In this case, the second inner electrode material layers 73 and 76 are formed so as not to lead to edges 71b and 74b. Accordingly, etching may be made only in side edge portions of the second inner electrode material layers 73 and 76. More specifically, a front end margin region in the above described fourth embodiment is formed by providing a region having no inner electrode material layer printed thereon.

Figure 26A:
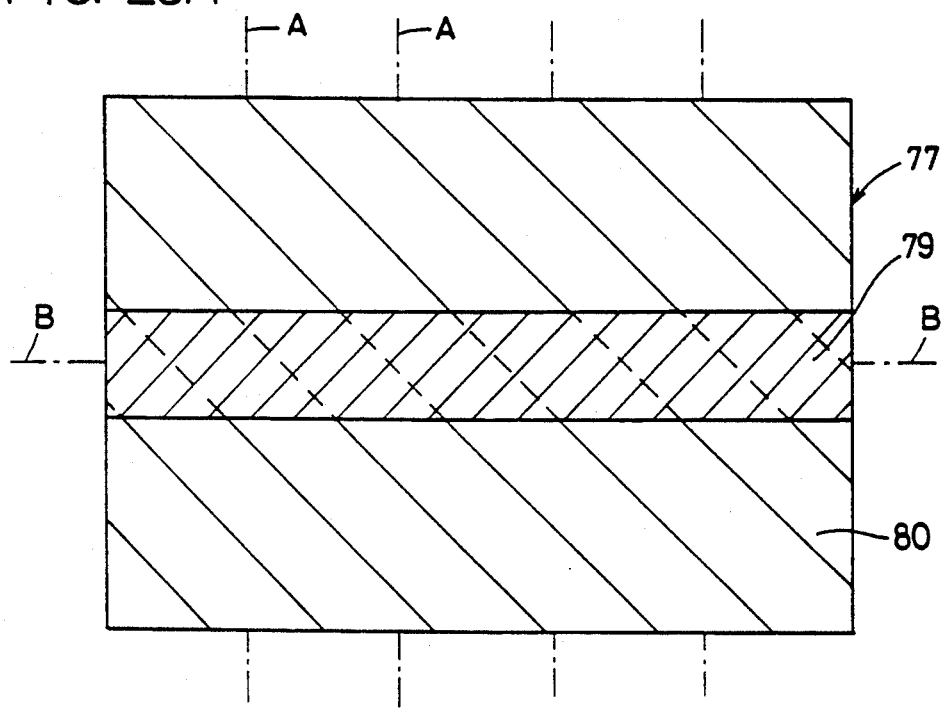
FIGS. 26A and 26B are plan views for explaining another example of the shapes in printing of a mother ceramic green sheet used in the fourth embodiment of the present invention and inner electrode materials.
Figure 26B:
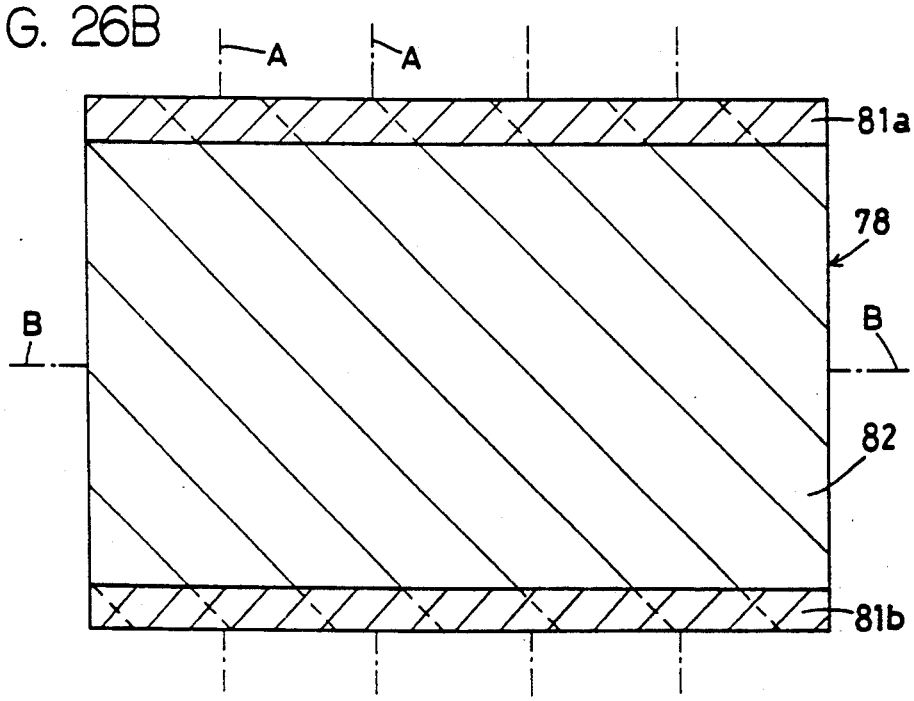

Alternatively, a plurality of mother ceramic green sheets 77 and 78 shown in FIGS. 26A and 26B may be alternately laminated. In FIG. 26A, a second inner electrode material layer 80 is printed on the entire surface of the ceramic green sheet 77, and a first inner electrode material layer 79 is printed in a strip shape in the center thereof. On the other hand, a second inner electrode material layer 82 is printed on the entire surface of the ceramic green sheet 78, and first inner electrode material layers 81a and 81b are printed along both edges thereof with they being superimposed on the second inner electrode material layer 82. A plurality of ceramic green sheets 77 and 78 are alternately laminated and then, cut in portions corresponding to portions along one dot and dash lines A and B, thereby to make it possible to obtain a dielectric green chip having the same structure as that in the above described fourth embodiment.

Fifth embodiment

Referring to FIGS. 27 to 29B, description is made of a method of fabricating a multilayer capacitor according to a fifth embodiment of the present invention. The fabricating method according to the fifth embodiment corresponds to a modification of the above described fabricating method according to the fourth embodiment. Consequently, the fabricating method according to the fifth embodiment will be described while incorporating the description of the fabricating method according to the fourth embodiment by reference.

Figure 27:
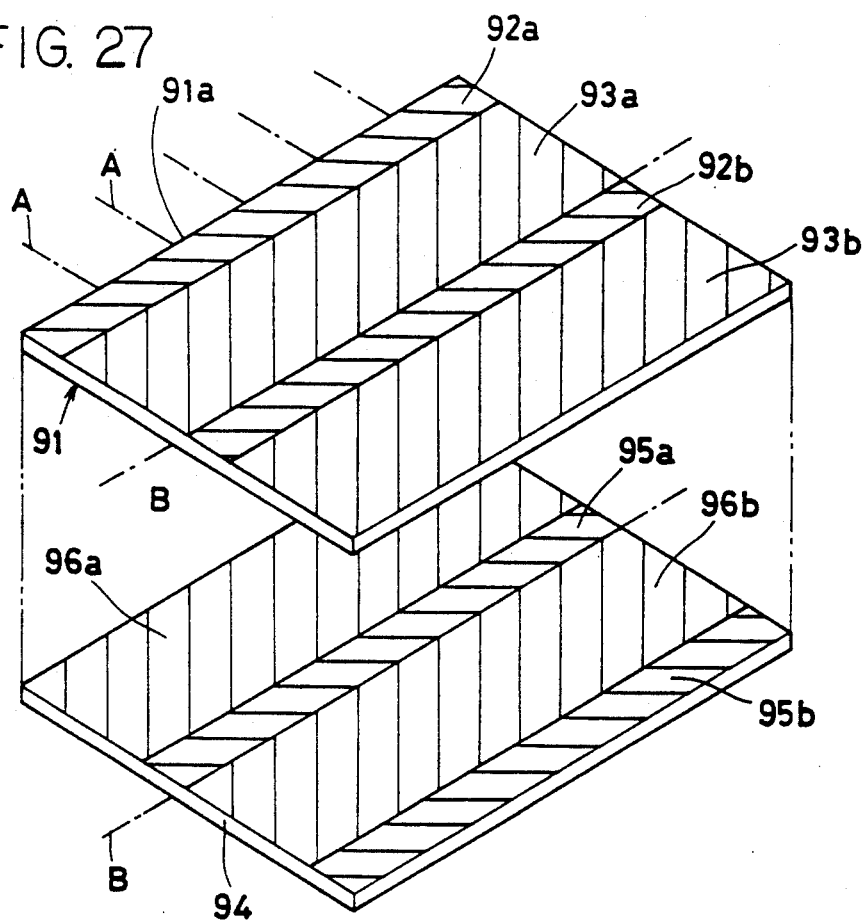
FIG. 27 is a perspective view for explaining the shapes in printing of mother ceramic green sheets used in a fifth embodiment of the present invention and inner electrode materials formed thereon.

First, as shown in FIG. 27, a first inner electrode material layer 92a is printed in a strip shape along one edge 91a on the upper surface of a rectangular mother ceramic green sheet 91. A first inner electrode material layer 92b is printed parallel to the one edge 91a spaced apart from this first inner electrode material layer 92a by a predetermined distance. Second inner electrode material layers 93a and 93b having a width larger than those of the first inner electrode material layers 92a and 92b are printed in the remaining regions.

Similarly, first inner electrode material layers 95a and 95b and second inner electrode material layers 96a and 96b are printed on the upper surface of a ceramic green sheet 94. As seen in FIG. 27, a printing pattern of the inner electrode material layers printed on the upper surface of the mother ceramic green sheet 94 corresponds to a printing pattern obtained by reversing a printing pattern of the inner electrode material layers formed on the upper surface of the ceramic green sheet 91 by 180°.

As understood from the foregoing description, the fifth embodiment is the same as the fourth embodiment except that the first inner electrode material layers and the second inner electrode material layers are printed in different regions on the ceramic green sheet. More specifically, the first inner electrode material layers 92a, 92b, 95a and 95b are constituted by materials which are not easily engraved by a chemical agent for etching used in the etching process as described later. On the other hand, the second inner electrode material layers 93a, 93b, 96a and 96b are constituted by materials which are easily etched by the chemical agent for etching.

Figure 28:
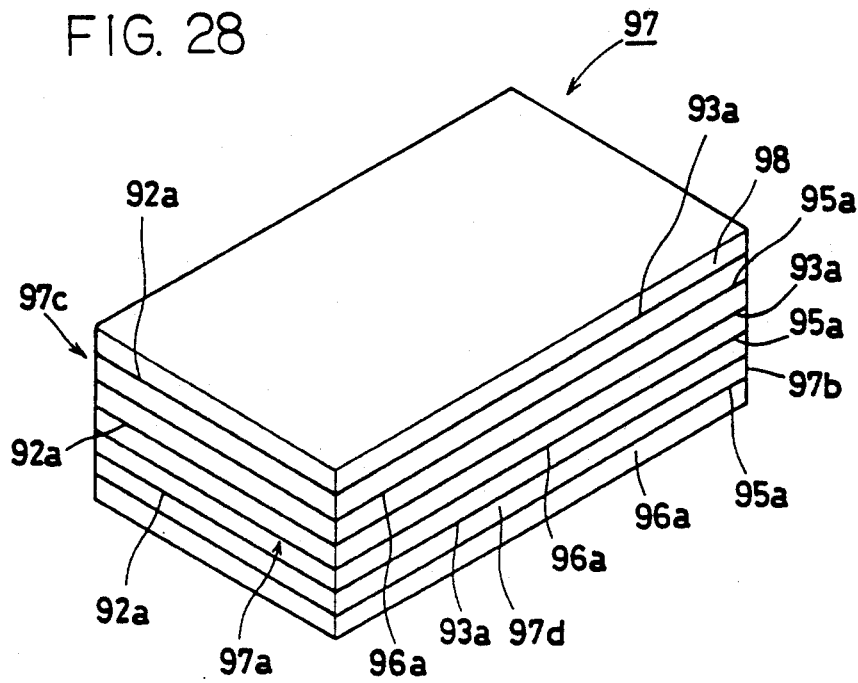
FIG. 28 is a perspective view showing a monolithic type dielectric green chip.

The above described ceramic green sheets 91 and 94 are laminated in the same manner as that in the fourth embodiment and cut in portions corresponding to one dot and dash lines A and B, thereby to obtain a monolithic type dielectric green chip 97 shown in FIG. 28.

The first inner electrode material layers 92a, 92a and 92a and 95a, 95a and 95a are respectively exposed to opposed first and second end surfaces 97a and 97b of the dielectric green chip 97. In addition, the second inner electrode material layers 93a and 96a arranged so as to be connected to the first inner electrode material layers 92a and 95a have the same width as that of the ceramic green sheets and thus, are exposed to side surfaces 97c and 97d of the dielectric green chip 97. In order to define the positions where the first inner electrode material layers and the second inner electrode material layers are arranged, a vertical section and a horizontal section of the dielectric green chip 97 are shown in FIGS. 29A and 29B.

Figure 29A:
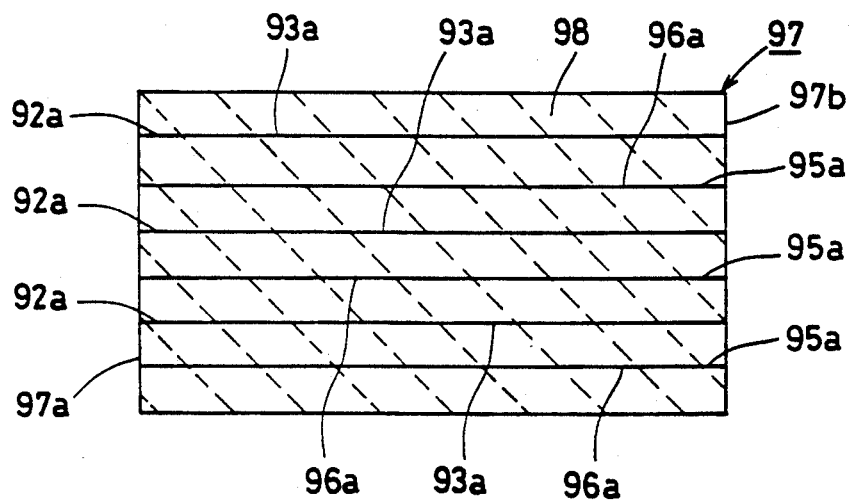
FIGS. 29A and 29B are a sectional side elevation view and a horizontal sectional view showing the dielectric green chip shown in FIG. 28.
Figure 29B:
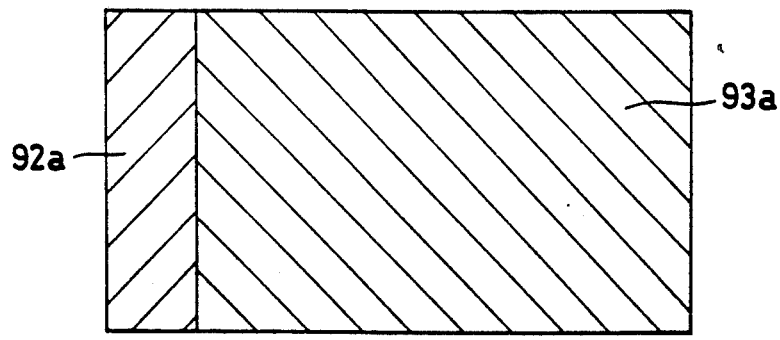

As will be understood from the comparison of FIGS. 28, 29A and 29B with FIGS. 20, 21A and 21B shown in the description of the fourth embodiment, the dielectric green chip 97 has a structure similar to that of the dielectric green chip 57 prepared in the fourth embodiment. The fifth embodiment is the same as the fourth embodiment except that the first inner electrode material layers are overlapped with the second inner electrode material layers in the fourth embodiment, while the first inner electrode material layers 92a and 95a and the second inner electrode material layers 93a and 96a are arranged so as not to be overlapped with each other in the fifth embodiment. Consequently, the dielectric green chip 97 is fired and etched to form outer electrodes in the same manner as that in the fourth embodiment, thereby to make it possible to obtain a multilayer capacitor as in the fourth embodiment.

Although in describing the fifth embodiment, mother dielectric green sheets are laminated and cut, to obtain individual monolithic type dielectric green chips, mother ceramic green sheets need not be necessarily prepared in obtaining the monolithic type dielectric green chips. More specifically, individual dielectric green chips 97 may be obtained by preparing ceramic green sheets of size required to obtain the dielectric green chips 97 and laminating the sheets.

Although in the above described embodiments, a ceramic green sheet is used as a dielectric sheet, the present invention is not limited to a multilayer ceramic capacitor obtained by laminating a plurality of ceramic green sheets and cofiring the sheets along with inner electrode material layers. More specifically, a dielectric resin film can be also used as the dielectric sheet, and the present invention can be also applied to a so-called monolithic type film capacitor.

Furthermore, the present invention can be also applied to a winding type capacitor obtained by winding a longitudinal ceramic green sheet or a resin film along with inner electrodes formed on its major surface. Therefore, it should be noted that this type of winding capacitor is included in the multilayer capacitor referred to in the present invention.

What is claimed is:

1. A multilayer capacitor which has a monolithic type dielectric body having respective opposed pairs of end surfaces, side surfaces, and top and bottom surfaces, in which a plurality of dielectric layers are laminated with inner electrodes being interposed therebetween and in which the width of said inner electrodes between said side surfaces is made smaller than that of said dielectric layers so that side margin regions are provided at side parts of the inner electrodes, and having a pair of outer electrodes formed on respective end surfaces of said monolithic type dielectric body which are conductively connected to predetermined ones of said inner electrodes;

the multilayer capacitor being characterized in that said side margin regions are formed by etching side edges of said inner electrodes, at said side surfaces of the monolithic type dielectric body;

wherein the inner electrodes initially have the same width as said dielectric layers, and the side edges of the inner electrodes are exposed at said side surfaces, before said etching;

each of said outer electrodes extending onto said side, top and bottom surfaces from the respective end surface so as to form a five-sided cap on said monolithic type dielectric body.

2. The multilayer capacitor according to claim 1, wherein at least the side edges of said inner electrodes, after forming the side margin regions, are oxidized to form oxide films which increase adhesive strength between said inner electrodes and said dielectric layers.

3. The multilayer capacitor according to claim 2, characterized in that cavities formed in the side margin regions by etching said exposed side edges of the inner electrodes are filled with sealing materials.

4. The multilayer capacitor according to claim 1 characterized in that cavities formed in the side margin regions by etching said exposed side edges of the inner electrodes are filled with sealing materials.

5. The multilayer capacitor according to claim 1, wherein said dielectric layers comprise dielectric ceramic layers, and said monolithic type dielectric body comprises a monolithic type sintered body in which inner electrodes are alternately led out to said pair of end surfaces.

6. A method of fabricating a multilayer capacitor which includes a monolithic type dielectric body having respective opposed pairs of end surfaces, side surfaces, and top and bottom surfaces, in which a plurality of dielectric layers are laminated with inner electrodes being interposed therebetween and in which the width of the inner electrodes between said side surfaces is made smaller than that of said dielectric layers so that side margin regions are provided at side parts of the inner electrodes, and having a pair of outer electrodes formed on said end surfaces of said monolithic type dielectric body which are conductively connected to predetermined ones of said inner electrodes, comprising the steps of:

obtaining a monolithic type dielectric body in which a plurality of dielectric layers are laminated with inner electrodes being interposed therebetween and the width of the inner electrodes being made equal to that of the dielectric layers;

forming a pair of outer electrodes said end surfaces of said monolithic type dielectric body which are conductively connected to predetermined ones of said inner electrodes, said outer electrodes extending onto said side, top and bottom surfaces from said end surfaces so as to form a 5-sided cap on said multilayer capacitor;

forming side margin regions at side parts of the inner electrodes by etching side edges of said inner electrodes at said side surfaces of the monolithic type dielectric body at which said side edges of said inner electrodes are exposed.

7. The method of fabricating a multilayer capacitor according to claim 6, characterized by further comprising the steps of forming on one major surface of a rectangular mother dielectric sheet a plurality of mother inner electrode material layers in parallel spaced apart from each other by a predetermined distance so as to extend between opposed edges of the mother dielectric sheet, laminating mother dielectric sheets each having said mother inner electrode material layers formed thereon to obtain a monolithic type mother dielectric body, and cutting said monolithic type mother dielectric body in the direction of lamination, to obtain said monolithic type dielectric body.

8. The method of fabricating a multilayer capacitor according to claim 6, which further comprises the steps of forming on one major surface of a rectangular dielectric sheet an inner electrode material layer from one edge of the dielectric sheet toward the other edge opposed to the one edge so as not to lead to the other edge and over the entire width between a pair of side edges which connects said edges, and laminating a plurality of dielectric sheets such that their respective one edges to which the inner electrode material layers are led out are alternately located on opposite sides, to obtain said monolithic type dielectric body.

9. The method of fabricating a multilayer capacitor according to claim 8, characterized in that said step of forming side margin regions comprises the steps of coating first and second end surfaces of the monolithic type dielectric body which derive from the edges, to which the inner electrode materials are led out, of said dielectric sheets, with resist materials, etching inner electrode material portions exposed to a pair of side surfaces of the monolithic type dielectric body which derives from the side edges of said dielectric sheets using etchant which does not attack said resist materials, to form side margin regions between said side surfaces and the inner electrodes, and removing said resist materials.

10. The method of fabricating a multilayer capacitor according to claim 9, wherein said step of forming a pair of outer electrodes is performed after said step of forming side margin regions.

11. The method of fabricating a multilayer capacitor according to claim 10, characterized by further comprising the step of filling cavities formed after etching the exposed side edges of the inner electrodes on the side surfaces of said monolithic type dielectric body with sealing materials.

12. The method of fabricating a multilayer capacitor according to claim 9, characterized in that said step of forming side margin regions is performed after said step of forming a pair of outer electrodes.

13. The method of fabricating a multilayer capacitor according to claim 12, characterized by further comprising the step of filling cavities formed after etching the exposed side edges of the inner electrodes on the side surfaces of said monolithic type dielectric body with sealing materials.

14. The method of fabricating a multilayer capacitor according to claim 9, characterized by further comprising the step of filling cavities formed after etching the exposed side edges of the inner electrodes on the side surfaces of said monolithic type dielectric body with sealing materials.

15. The method of fabricating a multilayer capacitor according to claim 9, characterized by further comprising the step of heating said monolithic type dielectric body in an oxidation atmosphere and oxidizing at least the side edges of the inner electrodes to form oxide films after said step of forming side margin regions, so as to increase adhesive strength between said inner electrodes and said dielectric layers.

16. The method of fabricating a multilayer capacitor according to claim 9, wherein Ni paste containing Ni is used as said resist materials.

17. The method of fabricating a multilayer capacitor according to claim 9, which further comprises the step of heating or neutralizing etchant remaining in spaces where said side margin regions are formed not to act as an etching material after said step of forming side margin regions.

18. The method of fabricating a multilayer capacitor according to claim 6, characterized in that said step of obtaining a monolithic type dielectric body comprises the steps of laminating a plurality of ceramic green sheets each having on its one major surface a first inner electrode material layer comprising a difficult etching material provided to the vicinity of its one edge along the edge and a second inner electrode material layer comprising an easy etching material provided so as to extend from one edge to the other edge opposed to said one edge and over the entire width on the side of an upper or lower surface of the first inner electrode material layer such that their respective one edges on the side of the first inner electrode material layers provided are alternately located on opposite end surfaces in the direction of thickness to obtain a monolithic type dielectric green chip, and firing said monolithic type dielectric green chip to sinter the ceramic green sheets as well as baking the first and second inner electrode material layers to form a plurality of inner electrodes each having first and second inner electrode portions, to obtain a monolithic type laminated body, and said process of forming side margin regions is performed by etching the monolithic type dielectric body by a chemical agent for selectively engraving said second inner electrode portions to remove at least portions, which are exposed to the side surfaces of the dielectric body, of the second inner electrode portions and their vicinities, and characterized by further comprising the step of forming a pair of outer electrodes on opposed first and second end surfaces, to which said first inner electrode portions are exposed, of the dielectric body.

19. The method of fabricating a multilayer capacitor according to claim 6, characterized in that said step of obtaining a monolithic type dielectric body comprises the steps of laminating a plurality of ceramic green sheets each having a first inner electrode material layer comprising a difficult etching material provided in the vicinity of its one edge along the edge and a second inner electrode material layer comprising an easy etching material provided over the entire width so as to be connected to the first inner electrode material layers and extend to an edge opposed to said one edge such that their respective edges on the side of the first inner electrode materials provided are alternately located on opposite end surfaces in the direction of thickness, to obtain a monolithic type dielectric green chip, and firing said monolithic type dielectric green chip to sinter the ceramic green sheets as well as baking the first and second inner electrode material layers to form a plurality of inner electrodes each comprising first and second inner electrode portions, to obtain a monolithic type dielectric body, and said step of forming side margin regions is performed by etching the side surfaces of said monolithic type dielectric body by a chemical agent for selectively engraving the second inner electrode portions to remove at least portions, which are exposed to the side surfaces of the dielectric body, of the second inner electrode portions and their vicinities, and characterized by further comprising the step of forming outer electrodes on first and second end surfaces, to which said inner electrodes are led out, of the dielectric body.

* * * * *